US012806759B2

(12) United States Patent
Lownik et al.

(10) Patent No.: US 12,806,759 B2
(45) Date of Patent: Nov. 24, 2026

(54) COUPLING SYSTEMS AND PLATFORMS

(71) Applicant: Milwaukee Electric Tool Corporation, Brookfield, WI (US)

(72) Inventors: Matthew A Lownik, Wauwatosa, WI (US); Caleb C. Adams, Milwaukee, WI (US); George Barton, Mequon, WI (US); Scott M. Hangartner, Richfield, WI (US); Nicole Z Summersett, Milwaukee, WI (US); Honesto D. Camposagrado, West Allis, WI (US); Lucy Seokyung Cho, Rolling Meadows, IL (US); Christian R. Braun, Milwaukee, WI (US); Joshua D. Schneider, Grayslake, IL (US); Aaron S. Blumenthal, Shorewood, WI (US); Aaron M. Williams, Milwaukee, WI (US); Grant T. Squiers, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/448,833

(22) Filed: Jan. 14, 2026

(65) Prior Publication Data

US 2026/0145314 A1 May 28, 2026

Related U.S. Application Data

(63) Continuation of application No. 18/162,969, filed on Feb. 1, 2023, which is a continuation of application No. PCT/US2023/061156, filed on Jan. 24, 2023.

(Continued)

(51) Int. Cl.
*B25H 3/04* (2006.01)
*F16M 13/02* (2006.01)

(52) U.S. Cl.
CPC ............... *B25H 3/04* (2013.01); *F16M 13/02* (2013.01)

(58) Field of Classification Search
CPC . B25H 3/04; B25H 3/02; B25H 3/021; B25H 3/06; B25H 3/023; B25H 3/00;
(Continued)

(56) References Cited

U.S. PATENT DOCUMENTS 2,695,105 A 11/1954 Mitchell
3,424,334 A 1/1969 Goltz
(Continued)

FOREIGN PATENT DOCUMENTS

DE 4447208 7/1998
DE 20100181 7/2001
(Continued)

OTHER PUBLICATIONS

Inter Partes Review No. 2024-01400, "Petition for Inter Partes Review of U.S. Pat. No. 11,365,026" Filed Sep. 17, 2024, 147 pages.

(Continued)

*Primary Examiner* — Patrick D Hawn
(74) *Attorney, Agent, or Firm* — Reinhart Boerner Van Deuren s.c.

(57) ABSTRACT

One or more coupling mechanisms for a modular system are provided. The coupling mechanisms work with modular units in a system, such as modular tool storage units. The coupling systems are configured to couple with and integrate various objects into the modular system, such as bags and tools. The coupling systems include various configurations of male and female couplers to facilitate coupling with utility modules including corresponding male and female couplers.

5 Claims, 40 Drawing Sheets

Related U.S. Application Data

(60) Provisional application No. 63/319,569, filed on Mar. 14, 2022, provisional application No. 63/303,207, filed on Jan. 26, 2022.

(58) Field of Classification Search
CPC .......... B25H 3/028; B25H 1/08; F16M 13/02; A47B 96/067; A47B 96/1466; A47F 5/0846; A47F 5/0853
See application file for complete search history.

(56) References Cited

U.S. PATENT DOCUMENTS

| | | | | |
|---|---|---|---|---|
| 3,891,172 | A | 6/1975 | Einhorn | |
| 4,467,925 | A | 8/1984 | Ratzloff et al. | |
| 4,531,331 | A * | 7/1985 | Itagaki | A47F 5/0846 52/630 |
| 4,607,753 | A * | 8/1986 | Radek | A47F 5/0846 52/36.5 |
| 4,618,192 | A | 10/1986 | Kelley | |
| 4,763,797 | A | 8/1988 | Egan | |
| 4,869,378 | A * | 9/1989 | Miller | F16M 13/00 248/225.11 |
| 5,014,892 | A | 5/1991 | Copeland | |
| 5,544,396 | A | 8/1996 | Mekyska | |
| 5,715,951 | A | 2/1998 | Dembicks | |
| 5,725,107 | A | 3/1998 | Dembicks | |
| 5,855,284 | A | 1/1999 | Dembicks | |
| 5,890,613 | A | 4/1999 | Williams | |
| 5,897,001 | A | 4/1999 | Dembicks | |
| 6,305,557 | B1 | 10/2001 | Brooks | |
| 6,564,949 | B1 | 5/2003 | Saathoff | |
| 6,945,414 | B1 | 9/2005 | Stevens et al. | |
| 6,983,946 | B2 | 1/2006 | Sullivan et al. | |
| 7,090,085 | B1 * | 8/2006 | Vicendese | B42F 7/00 403/381 |
| 7,228,977 | B2 * | 6/2007 | Perkins | A47B 95/008 211/94.01 |
| 7,591,385 | B2 | 9/2009 | Brooks | |
| 7,669,723 | B2 | 3/2010 | Kao | |
| 7,717,278 | B2 | 5/2010 | Kao | |
| 7,726,617 | B2 * | 6/2010 | Zambelli | F16M 11/2014 248/222.12 |
| D656,883 | S | 4/2012 | Patalak et al. | |
| D666,134 | S | 8/2012 | Patalak et al. | |
| 8,267,363 | B2 | 9/2012 | Begic et al. | |
| 8,485,482 | B2 | 7/2013 | Patalak et al. | |
| 8,528,871 | B2 | 9/2013 | Begic et al. | |
| 8,573,415 | B2 | 11/2013 | Ernst et al. | |
| 8,740,010 | B1 | 6/2014 | Page | |
| 9,375,835 | B1 | 6/2016 | Lin | |
| 9,591,931 | B1 | 3/2017 | Oren | |
| 9,763,528 | B2 * | 9/2017 | Lung | A47F 5/0846 |
| 9,765,923 | B2 | 9/2017 | Skull et al. | |
| 10,222,172 | B2 | 3/2019 | Melville | |
| 10,271,634 | B1 | 4/2019 | Eynav | |
| 10,350,746 | B2 | 7/2019 | Martinez et al. | |
| 10,405,676 | B1 | 9/2019 | Underwood | |
| 10,583,962 | B2 | 3/2020 | Brunner et al. | |
| 10,750,833 | B2 | 8/2020 | Burchia | |
| 10,772,444 | B2 | 9/2020 | Stas | |
| 11,638,992 | B2 | 5/2023 | Jessop | |
| 11,840,269 | B2 | 12/2023 | Brunner et al. | |
| 11,926,034 | B1 | 3/2024 | Yu | |
| 12,036,660 | B2 | 7/2024 | Groves et al. | |
| 12,077,202 | B2 | 9/2024 | Williams et al. | |
| 12,090,625 | B2 | 9/2024 | Barton | |
| 12,115,649 | B2 | 10/2024 | Williams et al. | |
| 12,167,804 | B2 | 12/2024 | Nelson et al. | |
| 12,179,335 | B2 | 12/2024 | Fedrigon et al. | |
| 12,187,491 | B2 | 1/2025 | Squiers et al. | |
| 12,194,613 | B2 | 1/2025 | Nair et al. | |
| 12,226,891 | B2 | 2/2025 | Holland et al. | |
| 12,290,914 | B2 | 5/2025 | Schwei | |
| 12,295,506 | B2 | 5/2025 | Paprocki et al. | |
| 12,466,056 | B2 | 11/2025 | Adams | |
| 2003/0139080 | A1 | 7/2003 | Lafragette et al. | |
| 2005/0269276 | A1 | 12/2005 | Pfeiffer | |
| 2007/0138041 | A1 | 6/2007 | Welsh | |
| 2007/0262037 | A1 | 11/2007 | Cheng | |
| 2008/0006592 | A1 | 1/2008 | Brooks | |
| 2009/0145866 | A1 | 6/2009 | Panosian et al. | |
| 2010/0071168 | A1 | 3/2010 | Miller | |
| 2010/0327134 | A1 | 12/2010 | Lundrigan et al. | |
| 2011/0260588 | A1 | 10/2011 | Lin | |
| 2011/0303798 | A1 | 12/2011 | Bader et al. | |
| 2013/0127129 | A1 | 5/2013 | Bensman et al. | |
| 2013/0334383 | A1 | 12/2013 | Begic et al. | |
| 2014/0265440 | A1 | 9/2014 | Chen et al. | |
| 2017/0166352 | A1 | 6/2017 | Hoppe et al. | |
| 2019/0225371 | A1 | 7/2019 | Hoppe et al. | |
| 2019/0246777 | A1 | 8/2019 | Eynav | |
| 2020/0147781 | A1 | 5/2020 | Squiers et al. | |
| 2020/0165036 | A1 | 5/2020 | Squiers et al. | |
| 2021/0085101 | A1 | 3/2021 | Thrush | |
| 2022/0089421 | A1 | 3/2022 | Hargis et al. | |
| 2023/0013694 | A1 | 1/2023 | Evatt et al. | |
| 2023/0122425 | A1 | 4/2023 | Camp et al. | |
| 2023/0182281 | A1 | 6/2023 | Keller | |

FOREIGN PATENT DOCUMENTS

| | | | |
|---|---|---|---|
| DE | 202014103695 | | 10/2014 |
| DE | 102015112035 | | 4/2016 |
| DE | 102007030925 | | 3/2020 |
| EP | 1029480 | | 8/2000 |
| EP | 1724069 | A2 | 11/2006 |
| EP | 2537641 | B1 | 9/2016 |
| EP | 2338650 | B1 | 10/2016 |
| GB | 2211486 | | 7/1989 |
| JP | 2017/001132 | | 1/2017 |
| KR | 10-2021-0013850 | | 2/2021 |
| WO | WO2014/125484 | | 8/2014 |
| WO | WO2023164684 | | 8/2023 |

OTHER PUBLICATIONS

Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.

(56) References Cited

OTHER PUBLICATIONS

Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794, 952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.
International Search Report and Written Opinion for International Application No. PCT/US2023/061156, dated May 22, 2023, 13 pages.

* cited by examiner

COUPLING SYSTEMS AND PLATFORMS

CROSS-REFERENCE TO RELATED PATENT APPLICATIONS

The present application is a continuation of U.S. application Ser. No. 18/162,969, filed Feb. 1, 2023, which is a continuation of International Application No. PCT/US 2023/061156, filed Jan. 24, 2023, which claims the benefit of and priority to U.S. Provisional Application No. 63/319,569, filed on Mar. 14, 2022, and U.S. Provisional Application No. 63/303,207, filed on Jan. 26, 2022, each of which is incorporated herein by reference in its entirety.

BACKGROUND OF THE INVENTION

The present disclosure is directed generally to the field of containers and related devices. The present disclosure relates specifically to various coupling mechanisms to detachably couple items within a modular system.

Tool storage units are often used to transport tools and tool accessories. Some storage units are designed to incorporate into a modular storage system. Various accessories can be configured to interface within a modular system, such as accessories to couple tools and objects within the modular system.

SUMMARY OF THE INVENTION

One embodiment of the invention relates to a mounting system including a first plate configured to be coupled to a wall and a support element slidably coupled to the first plate. The support element includes a base slidably coupled to the first plate, and a first rib extending from the base in a first direction. The first rib is offset from the first plate, and the first rib is configured to detachably couple with a utility module such that a first portion of the utility module is disposed between the first rib and the first plate.

Another embodiment of the invention relates to a support element including a base extending along a primary longitudinal axis that extends vertically, a first aperture defined by and extending through the base, a first rib extending from the base in a first direction, the first rib offset from the plate, and a second rib extending from the base in a second direction opposite the first direction, the second rib offset from the plate. The first aperture is configured to receive a fastener extending through the first aperture, and the fastener slidably couples the base to a plate. The first rib and the second rib are configured to detachably couple with a utility module such that a first portion of the utility module is disposed between the first rib and the plate and a second portion of the utility module is disposed between the second rib and the plate.

Another embodiment of the invention relates to a coupling platform including a base, a first wall extending from the base, a second wall extending from the base, a first tongue extending from the first wall towards the second wall, the first tongue offset from the base, a second tongue extending from the second wall towards the first wall, the second tongue offset from the base, a first locking element coupled to the first wall, and a second locking element coupled to the second wall. The first locking element is configured to actuate between an unlocked position and a locked position, and the first locking element is closer to the second wall when in the locked position than in the unlocked position. The second locking element is configured to actuate between an unlocked position and a locked position, and the second locking element is closer to the first wall when in the locked position than in the unlocked position.

Another embodiment of the invention relates to a coupling system. The coupling system includes a plate and a support element. The plate is configured to be coupled to a wall. The support element is slidably coupled to the plate. The support element includes a coupling element slidably coupled to the plate, a base extending from the coupling element away from the plate, a first rib and a second rib. The first rib extends from the base in a first direction, and the first rib is offset from the plate. The second rib extends from the base in a second direction opposite the first direction, and the second rib is offset from the plate. The first rib and the second rib are configured to detachably couple with an object such that a first portion of the object is disposed between the first rib and the plate and a second portion of the object is disposed between the second rib and the plate.

In various embodiments, the plate defines a channel that extends laterally along the base. The channel is configured to interface with the support element as the support element slides with respect to the plate. In various embodiments, the channel is configured to bias the support element upward when the support element is slidably coupled to the plate. In various embodiments, the first rib defines a first angled upper surface that faces upward and away from the second rib, and the second rib defines a second angled upper surface that faces upward and away from the first rib.

Another embodiment of the invention relates to a coupling platform including a base, a first wall, a second wall extending from the base, a first tongue, a second tongue, a first locking element, and a second locking element. The first tongue extends from the first wall towards the second wall, and the first tongue is offset from the base. The second tongue extends from the second wall towards the first wall, and the second tongue is offset from the base. The first locking element is coupled to the first wall. The first locking element is configured to actuate between an unlocked position and a locked position, and the first locking element is closer to the second wall when in the locked position than in the unlocked position. The second locking element is coupled to the second wall. The second locking element is configured to actuate between an unlocked position and a locked position, and the second locking element is closer to the first wall when in the locked position than in the unlocked position.

In various embodiments, the first upper portion of the first wall is closer to the second wall than the first lower portion of the first wall. In various embodiments, the second wall includes a second upper portion and a second lower portion, the second upper portion being closer to the first wall than the second lower portion. In various embodiments, the first locking element extends from the first upper portion when the first locking element is configured in the locked position.

Another embodiment of the invention relates to a coupling platform including a base, a first tongue, a second tongue, a first locking element, a second locking element, and a locking mechanism. The first tongue extends from the wall in a first direction, and the first tongue is offset from the base. The second tongue extends from the wall in a second direction opposite the first direction, and the second tongue is offset from the base. The first locking element is slidably coupled to the wall. The first locking element is configured to actuate between an unlocked position and a locked position, and the first locking element defines a first outer surface furthest from the second tongue. The second locking element is slidably coupled to the wall, and the second locking element is configured to actuate between an unlocked position and a locked position. The second locking element defines a second outer surface furthest from the first tongue. The locking mechanism is coupled to the wall, such as slidably coupled. The locking mechanism interfaces with each of the first locking element and the second locking element to actuate the first locking element and the second locking element between the locked position and the unlocked position. When the first locking element and the second locking element are in the unlocked position, the first outer surface and the second outer surface define a first width. When the first locking element and the second locking element are in the locked position, the first outer surface and the second outer surface define a second width greater than the first width.

Another embodiment of the invention relates to a coupling platform. The coupling platform includes a base extending along a longitudinal axis from a first end to a second end, a first coupling element coupled to the first end, and a second coupling element coupled to the second end. The first coupling element is configured to detachably couple to a first elongate structure extending from a first corner of a modular storage unit, and the second coupling element is configured to detachably couple to a second elongate structure extending from a second corner of the modular storage unit. The coupling platform includes a first wall extending from the base, a first tongue extending from the first wall in a first direction towards the first coupling element, and the first tongue extends above and is offset from the base. The coupling platform includes a second tongue extending from the first wall in a second direction opposite the first direction, the second tongue extending above and offset from the planar base.

In various embodiments, the coupling platform includes a second wall extending from the base, a third tongue extending from the second wall in the first direction towards the first wall, the third tongue extending above and offset from the base, and a fourth tongue extending from the second wall in the second direction, the fourth tongue extending above and offset from the planar base. In various embodiments the coupling platform includes a third wall extending from the base, a fifth tongue extending from the third wall in the first direction towards the second wall, the fifth tongue extending above and offset from the base, and a sixth tongue extending from the wall in the second direction towards the second coupling element, the sixth tongue extending above and offset from the planar base.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, a mounting system and various coupling mechanisms are shown. The mounting system includes one or more mounting structures, such as tiles configured to be coupled to a wall in a grid arrangement. The mounting structures include one or more support elements, which slide with respect to the mounting structure. The support elements are configured to couple to units within a modular system.

The coupling mechanism are configured to selectively couple and decouple with utility modules in a modular system, such as a tool storage unit. One or more of the coupling mechanisms include an interface to couple to one or more coupling recesses of the tool storage unit. In various embodiments, the coupling mechanisms include male couplers including tongues extending above and offset from a surface, and corresponding female couplers including ribs extending above and offset from a recessed surface. The mounting system provides a dynamically adjustable platform that the utility modules within the modular system can be coupled to. As a result, the configuration of the couplers in the mounting system can be repositioned to correspond to the sizes of the specific objects being coupled to the mounting system, thereby facilitating using the space occupied by the mounting system in a more efficient manner.

The coupling mechanisms provide the ability to quickly couple and decouple utility modules to a modular system. The term ‘utility module’ is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, beverage containers, etc., of any shape and size, and wherein any utility module can be detachably attached to the modular system.

Figure 1:
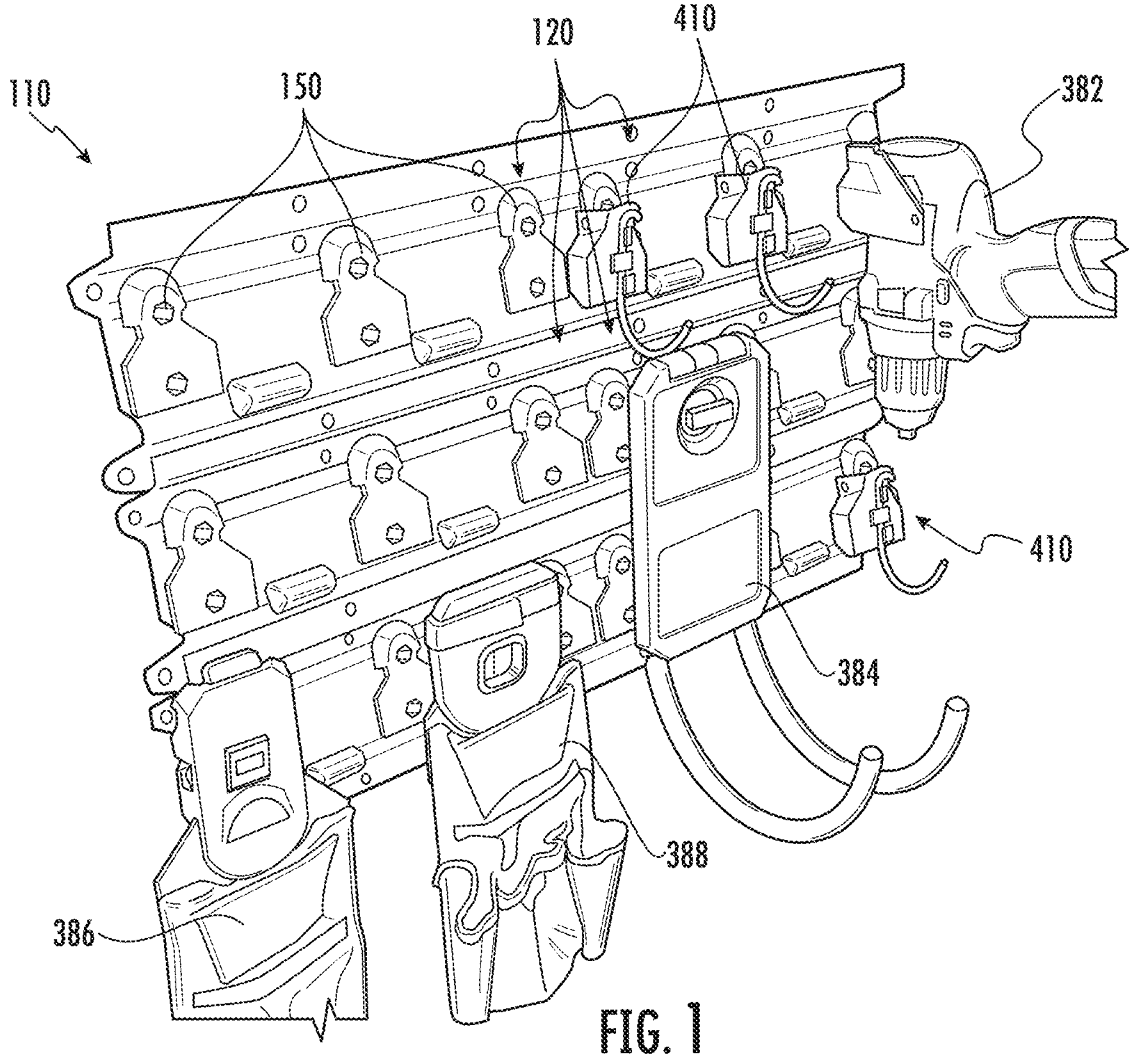
FIG. 1 is a perspective view of a mounting system, according to an exemplary embodiment.
Figure 2A:
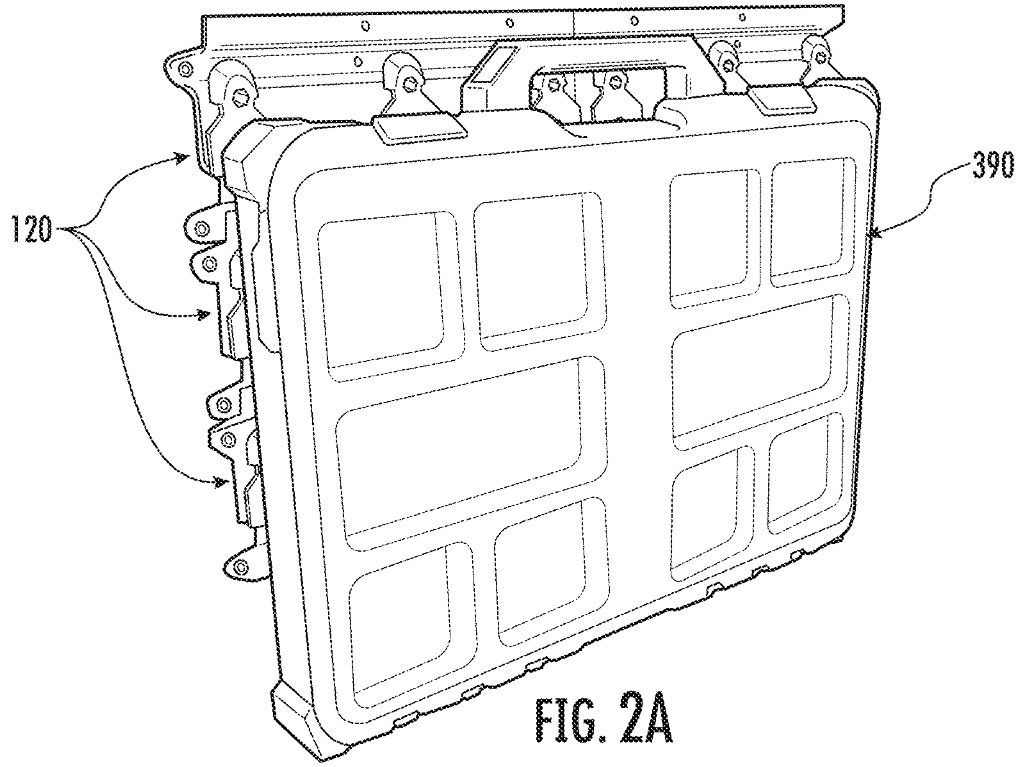
FIG. 2A is a perspective view of the mounting system of FIG. 1, according to an exemplary embodiment.
Figure 2B:
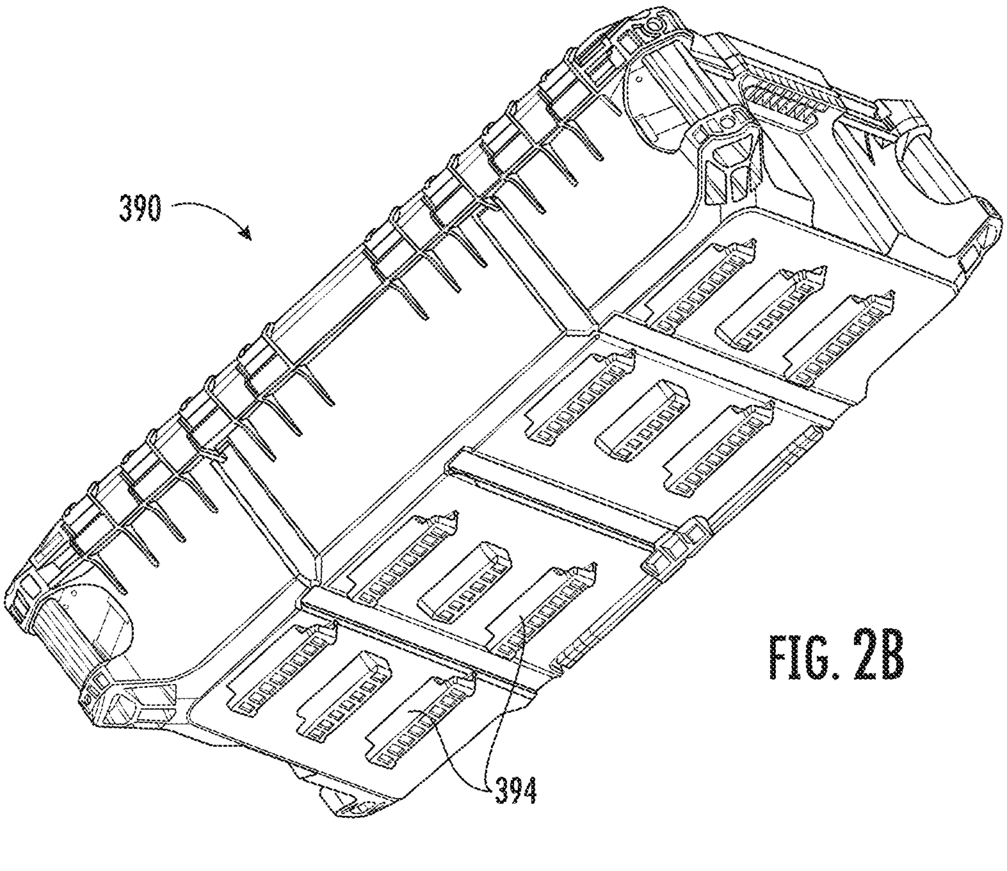
FIG. 2B is a perspective view of the modular tool storage container of FIG. 2A, according to an exemplary embodiment.
Figure 3:
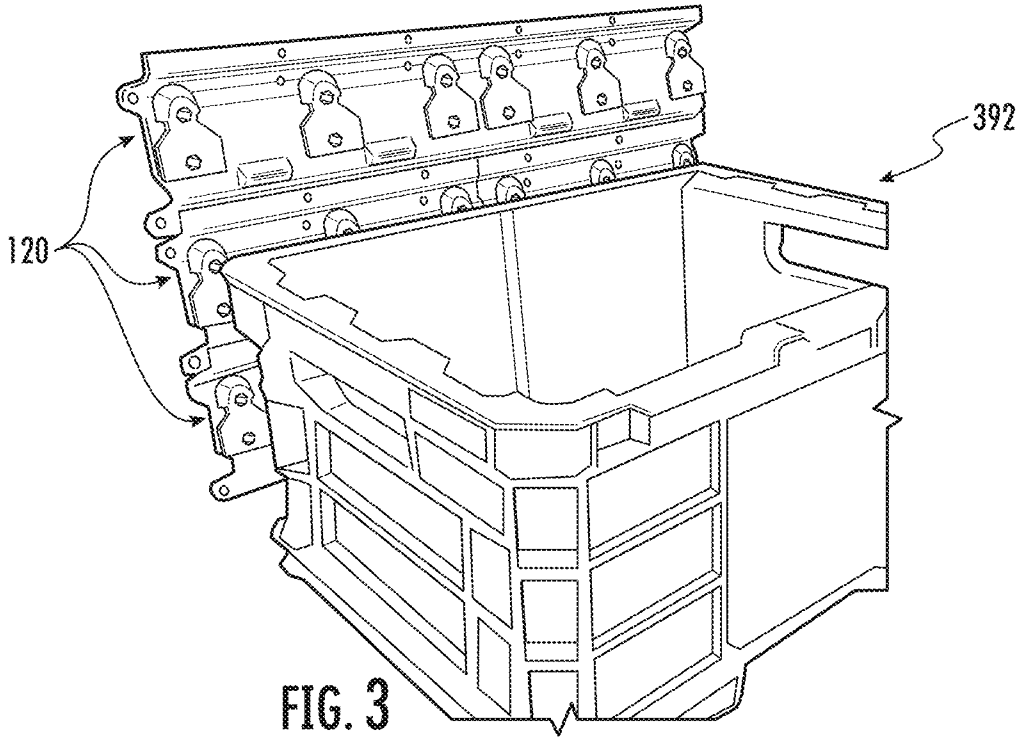
FIG. 3 is a perspective view of the mounting system of FIG. 1, according to an exemplary embodiment.

Referring to FIGS. 1-3, a mounting system 110 is shown according to an exemplary embodiment. Mounting system 110 includes one or more mounting structures 120. In various embodiments, mounting structures 120 are configured to be coupled to a surface, such as a wall, in a grid pattern (FIG. 1).

One or more support elements 150 are coupled to the mounting structures 120, such as slidably coupled. In various embodiments, support elements 150 slide with respect to mounting structures 120, such as by support elements sliding laterally. In various embodiments, mounting system 110 includes first plate 122, which is configured to be coupled to a wall, and support element 150 slidably coupled to the first plate 122.

In various embodiments, the coupling components and mechanisms described herein, such as support element 150, are compatible with the coupling mechanism(s) described in International Patent International Patent Publication No. WO 2017/191628, which is hereby incorporated by reference in its entirety.

Support elements 150 are configured to detachably couple with one or more objects and/or coupling mechanisms. Referring to FIG. 1, each coupling platform 410 is coupled to a support element 150, a power tool, such as a drill 382, is coupled to a coupling mechanism that detachably couples with one or more support elements 150, a hook 384 is coupled to a coupling mechanism that detachably couples with one or more support elements 150, and bag 386 and bag 388 are coupled to a coupling mechanism that detachably couples with one or more support elements 150.

Referring to FIGS. 2A-2B, a utility module, shown as modular tool storage container 390, detachably couples with one or more support elements 150. Bottom surface of modular tool storage container 390 includes a plurality of male couplers 394, which couple with support elements 150. For example, one support element 150 extends between two male couplers 394, and as a result support element 150 supports modular tool storage container 390. Referring to FIG. 3, a modular unit, shown as modular container 392, detachably couples with one or more support elements 150.

Figure 4:
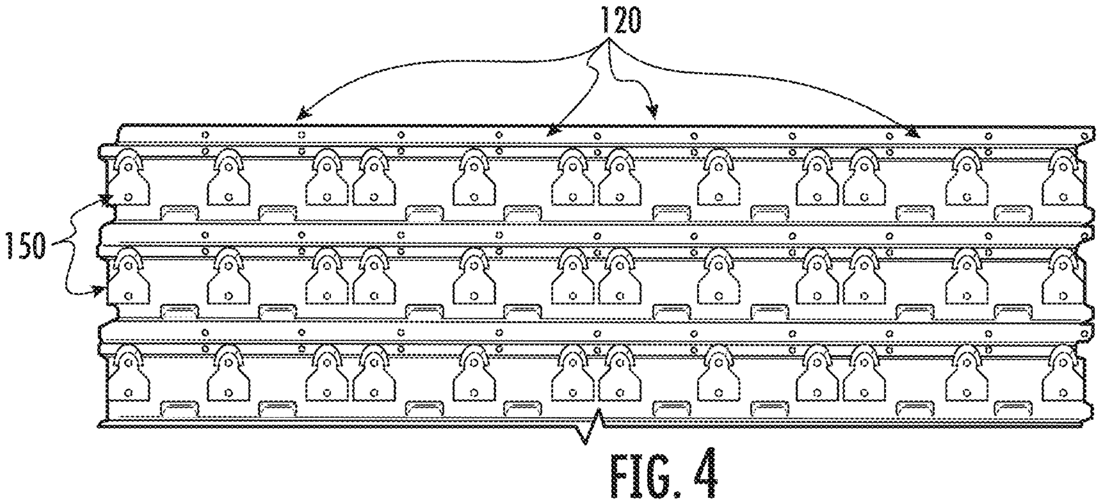
FIG. 4 is a front view of the mounting structure of the mounting system of FIG. 1, according to an exemplary embodiment.
Figure 5:
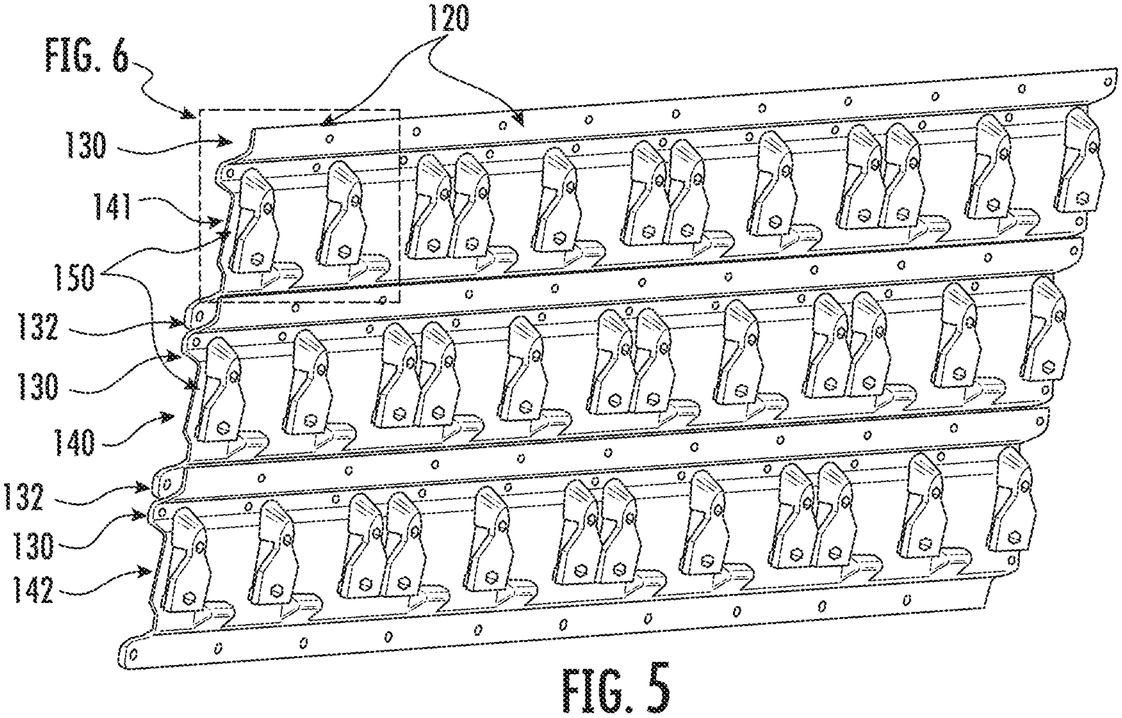
FIG. 5 is a perspective view of the mounting structure of the mounting system of FIG. 1, according to an exemplary embodiment.
Figure 6:
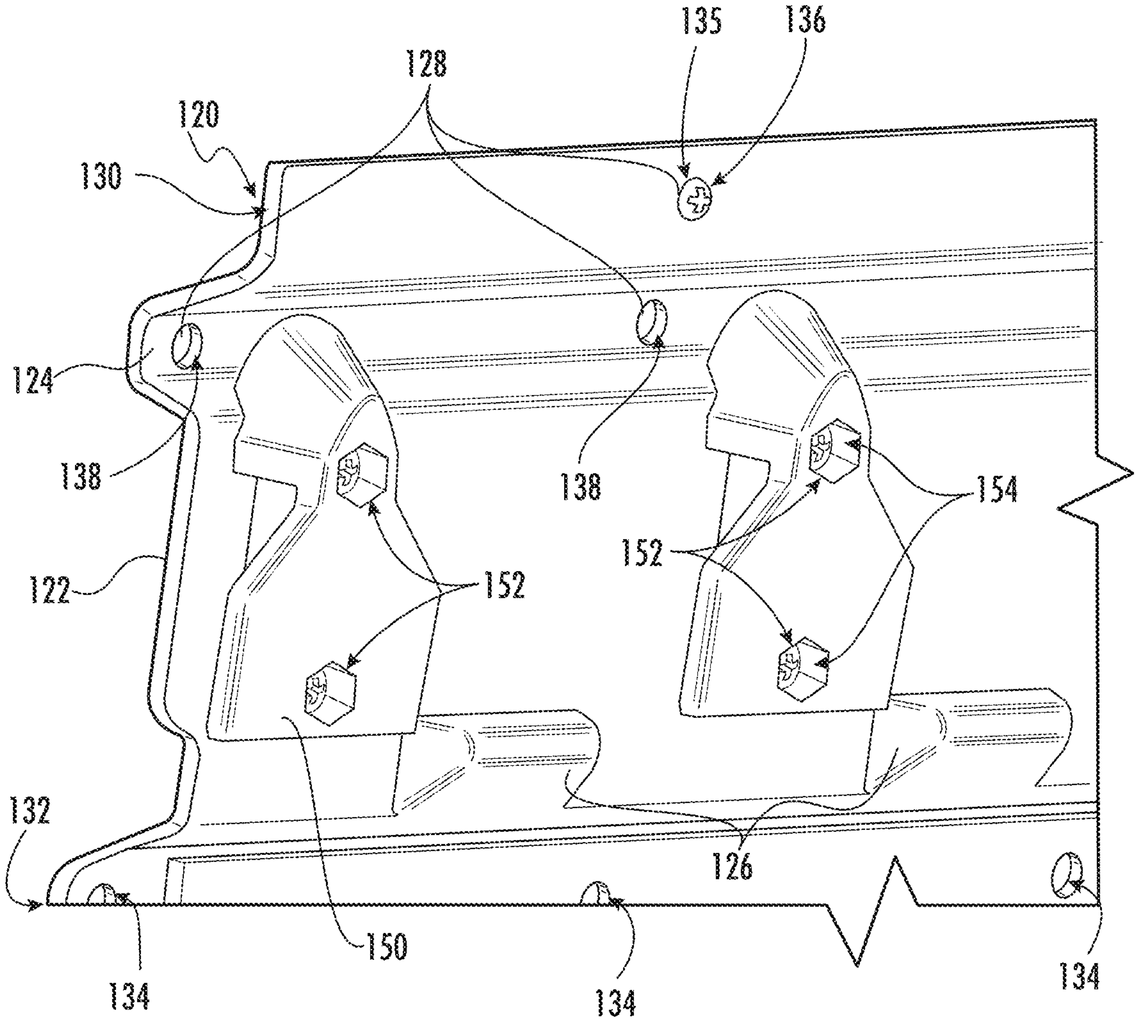
FIG. 6 is a detailed perspective view of the mounting structure of the mounting system of FIG. 1, according to an exemplary embodiment.
Figure 7:
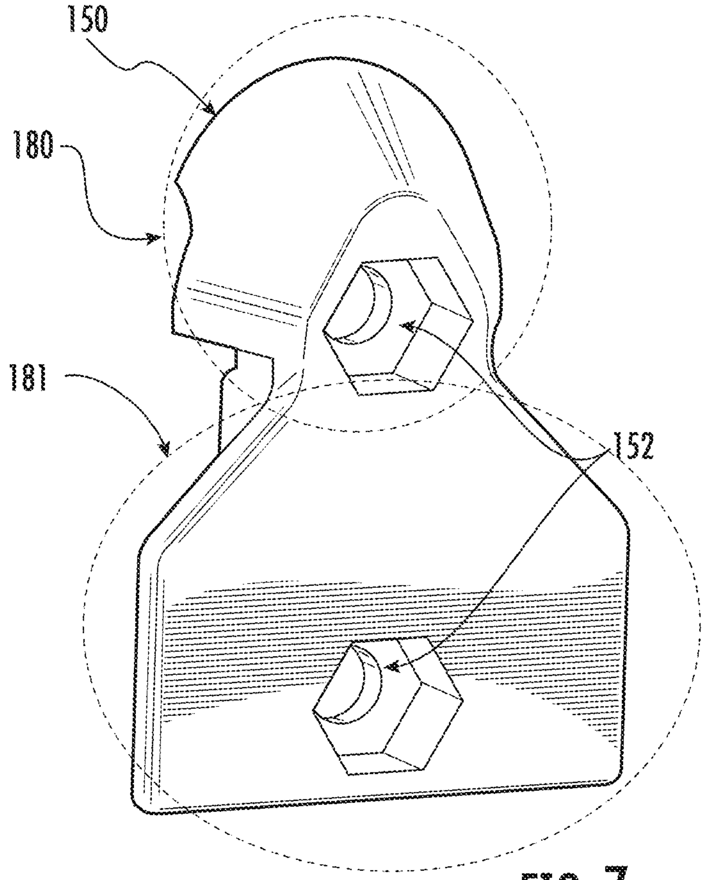
FIG. 7 is a perspective view of a support element of the mounting system of FIG. 1, according to an exemplary embodiment.

Referring to FIGS. 4-6, various aspects of mounting structures 120 are shown. One or more support elements 150 are slidably coupled to mounting structures 120.

In various embodiments, mounting structure 120 is configured to be coupled to a surface, such as a wall, via one or more coupling mechanism, shown as apertures 129. Mounting structure 120 includes a plate 122 and a recessed channel 124 defined within the plate 122. In various embodiments, recessed channel 124 extends laterally (e.g., horizontally) along plate 122 when mounting structure 120 is mounted to a wall. In various embodiments, channel 124 includes a recess that extends laterally across plate 122. One or more projections 126 extend outwardly from plate 122, such as away from the wall that mounting structure 120 is affixed to.

Referring to FIG. 5, in various embodiments each plate 122 includes a lower segment 130 and an upper segment 132, the lower segment 130 being positioned between the wall and the upper segment 132 of a lower plate. In various embodiments, the mounting system includes a first plate 140 that includes an upper segment 132 and a lower segment 130, and the mounting system includes a second plate 141 and a third plate 142. The second plate 141 is configured to be coupled to the wall above the first plate 140, and the third plate 142 is configured to be coupled to the wall below the first plate 140. The second plate 141 includes an upper segment 130 and a lower segment 132, and the lower segment 132 of the second plate 141 is positioned between the wall and the upper segment 130 of the first plate 140. The third plate 142 includes an upper segment 130 and a lower segment 132, and the lower segment 132 of the first plate 140 is positioned between the wall and the upper segment 130 of the third plate 142. Referring to FIG. 6, plate 122 includes apertures 134 in lower segment 130, apertures 136 in upper segment 132, and apertures 138 in recessed channel 124, and a fastener 135 (e.g., a screw) in one extending through one or more of aperture(s) 134, aperture(s) 136, and aperture(s) 138, the fastener 135 coupling plate 122 to a wall.

Referring to FIGS. 7-9B, various aspects of support elements 150 are shown. Support element 150 includes one or more coupling mechanisms, including apertures 152 (such as apertures defined by and extending through base 156), configured to couple support elements 150 to mounting structure 120 (e.g., to plate 122), and base 156 is coupled to the coupling mechanisms. The apertures 152 are configured to receive a fastener 154 (e.g., a screw and corresponding nut coupled to the screw), the fastener 154 slidably coupling the support element 150 to the plate 122.

Support element 150 includes base 156 slidably coupled to the first plate 122. Base 156 extends along a primary longitudinal axis 155, which in various embodiments and/or configurations extends vertically 155. Projection 158 extends from base 156 and interfaces with channel 124 to vertically support the support elements 150. In various embodiments, channel 124 is configured to bias the support element 150 upward when the support element 150 is slidably coupled to the plate 122.

Support element 150 includes first rib 160 extending in direction 162 from base 156, and second rib 166 extending in direction 168 from base 156 in a second direction opposite direction 162. In various embodiments, first rib 160 and second rib 166 are offset from plate 122. The first rib 160 and/or the second rib 166 are configured to detachably couple with a utility module (e.g., modular tool storage container 390) such that a first portion of the utility module (e.g., a first male coupler 394 of modular tool storage container 390) is disposed between the first rib 160 and the plate 122 and a second portion of the utility module (e.g., a second male coupler 394 of modular tool storage container 390) is disposed between the second rib 166 and the plate 122.

In various embodiments, first rib 160 defines an upper angled surface 164 that faces away from second rib 166 and upward, and second rib 166 defines an upper angled surface 170 that faces away from first rib 160 and upward. Upper angled surface 164 defines angle 176 with respect vertical axis V and/or primary longitudinal axis 155 of base 156. In various embodiments, angle 176 is between 20 degrees and 70 degrees, and more specifically between 30 degrees and 60 degrees, and even more specifically between 40 degrees and 50 degrees, and even more specifically 45 degrees. In various embodiments angled surface 170 defines a similar angle with respect to vertical axis V as angled surface 164.

First ledge 172 and second ledge 174, each of which define a surface facing downward in direction 178, are configured to couple support element 150 to one or more coupling mechanisms. In particular, an actuating element of a device coupled to support element 150 can be inserted beneath first ledge 172 and/or second ledge 174 to secure the device to support element 150 (e.g., to bias the device from being moved upward with respect to support element 150, thereby maintaining the coupling between the device and support element 150).

Figure 8:
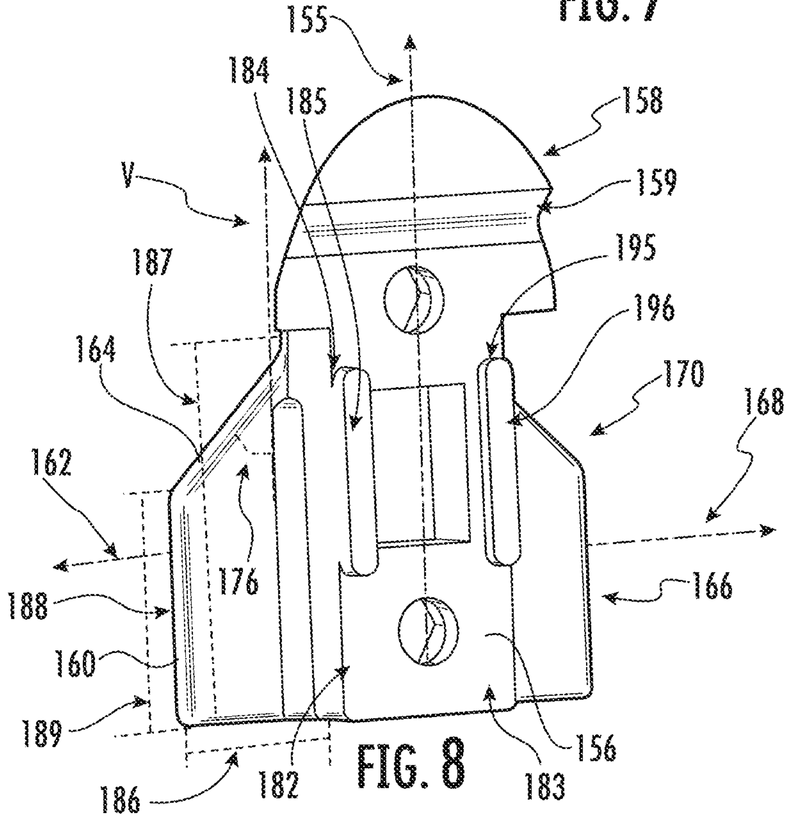
FIG. 8 is a perspective view from behind of the support element of FIG. 7, according to an exemplary embodiment.
Figure 9A:
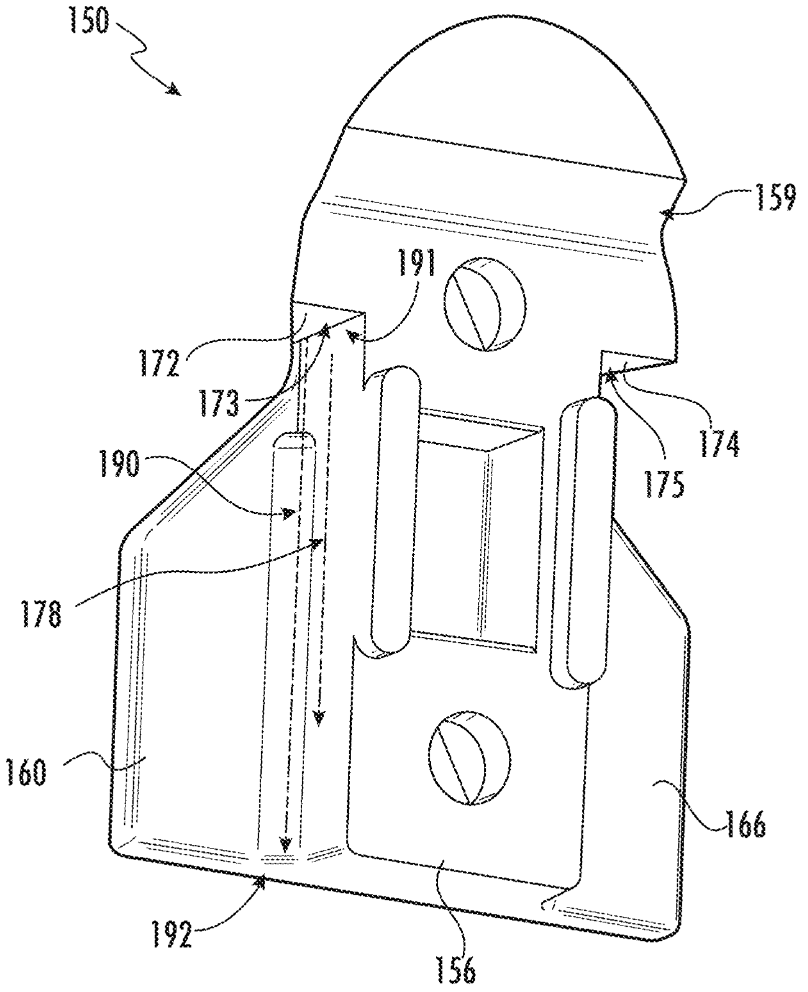
FIG. 9A is a perspective view from behind and below of the support element of FIG. 7, according to an exemplary embodiment.

Referring to FIGS. 8-9A, various aspects of first rib 160 and second rib 166 are shown. In various embodiments, second rib 166 is symmetrical with respect to first rib 160. In various embodiments, the first rib 160 extends in the first direction 162 a first width 186 from the base 156, and the first rib 160 extending along the primary longitudinal axis 155 a first length 187, wherein the first length 187 is longer than the first width 186. In various embodiments, the first length 187 is at least twice as long as the first width 186. Outer surface 188 of first rib 160 defines a length 189. In various embodiments, length 189 is longer than first width 186.

First channel 190 is defined at least in part by the first rib 160, the base 156, and the plate 122, the first channel 190 extending vertically downward from a closed back end 191 to an open front end 192. In various embodiments, support element 150 includes a first ledge 172 extending outward from the base 156 and facing downward towards the first channel (e.g., via lower surface 173 of ledge 172), the first ledge 172 defining the closed back end 191 of the first channel 190.

It will be understood that all descriptions of first rib 160 are equally descriptive of second rib 166, with the understanding that in various embodiments second rib 166 is symmetrical with respect to first rib 160. For example, ledge 174 defines a lower surface 175 that defines the closed back end of the second channel defined by the second rib 166.

Referring to FIG. 9A, in various embodiments, support element 150 includes a first projection 184 and a second projection 195, which include interfacing surface 185 and interfacing surface 196, respectively, each of which interfaces with the first plate 122. The first projection 184 is closer to the first rib 160 than the second rib 166 (e.g., first projection 184 extends from the left portion 182 of base 156) and the second projection 195 is closer to the second rib 166 than the first rib 160 (e.g., second projection 195 extends from the right portion 183 of base 156).

Figure 9B:
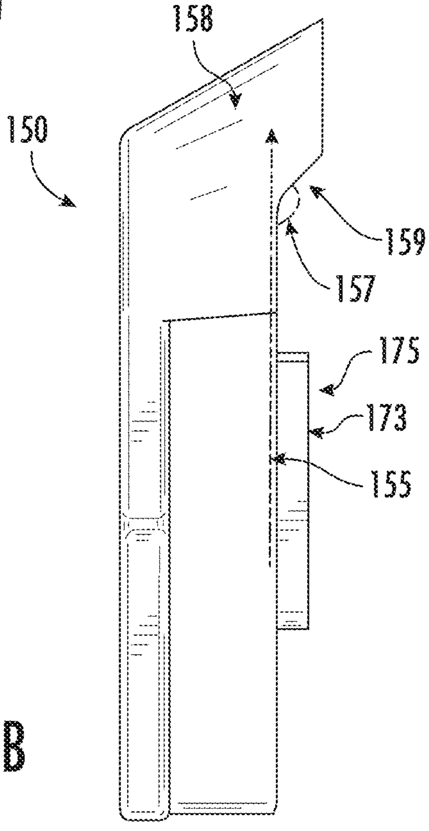
FIG. 9B is a cross-section of the support element of FIG. 7, according to an exemplary embodiment.

Referring to FIG. 9B, support element 150 includes a third projection 158 extending from the base 156, the third projection 158 extending laterally past the interfacing surface 185 of the first projection 184 and the interfacing surface 196 of the second projection 195. In various embodiments, the third projection 158 extends above the first projection 184 and the second projection 195

Third projection 158 extends from base 156 into recessed channel 124, the third projection 158 interfacing with plate 122 when support element 150 slides with respect to plate 122. Base 156 includes an upper portion 180 above the first rib 160 and/or second rib 166 and a lower portion 181 from which the first rib 160 and/or second rib 166 extends. In various embodiments, base 156 includes two apertures 152 configured to receive a fastener configured to couple base 156 to plate 122, with a first aperture 152 extending through upper portion 180 of base 156 and a second aperture 152 extending through lower portion 181 of base 156. In various embodiments, aperture(s) 152 include a hexagonal portion that is configured to rotationally stabilize a fastener with a hexagonal-shaped head to facilitate coupling an object (e.g., a bolt) to the fastener.

Projection 158 defines a supporting surface 159 that faces downward and towards the plate. In various embodiments supporting surface 159 defines an angle with respect to primary longitudinal axis 157 of base 156 between 30 degrees and 60 degrees, and more specifically between 40 degrees and 50 degrees, and even more specifically 45 degrees.

Referring to FIGS. 10-17, various aspects of coupling platform 210 are shown. Coupling platform 210 is configured to detachably couple with support element 150.

Coupling platform 210 includes body 212 and coupling element 220 coupled to body 212. Coupling element 220 is configured to couple coupling platform 210 to one or more objects, such as a bag. Body 212 defines a width 218. In particular, in various embodiments width 218 is between 30 mm and 70 mm, and more specifically is between 41 mm and 60 mm, and more specifically is between 50 mm and 54 mm, and more specifically is 52 mm. Applicant has observed that body 212 defining such a relatively narrow width enables an improved organization for objects being coupled to mounting structure 120 (e.g., objects can be coupled to mounting structure 120 at a customizable and closer distances).

As will be explained, coupling platform 210 includes a locking latch 214 configured to lock and unlock coupling platform 210 with other coupling mechanisms. In various embodiments, locking latch 214 actuates between a locked position and an unlocked position.

Figure 10:
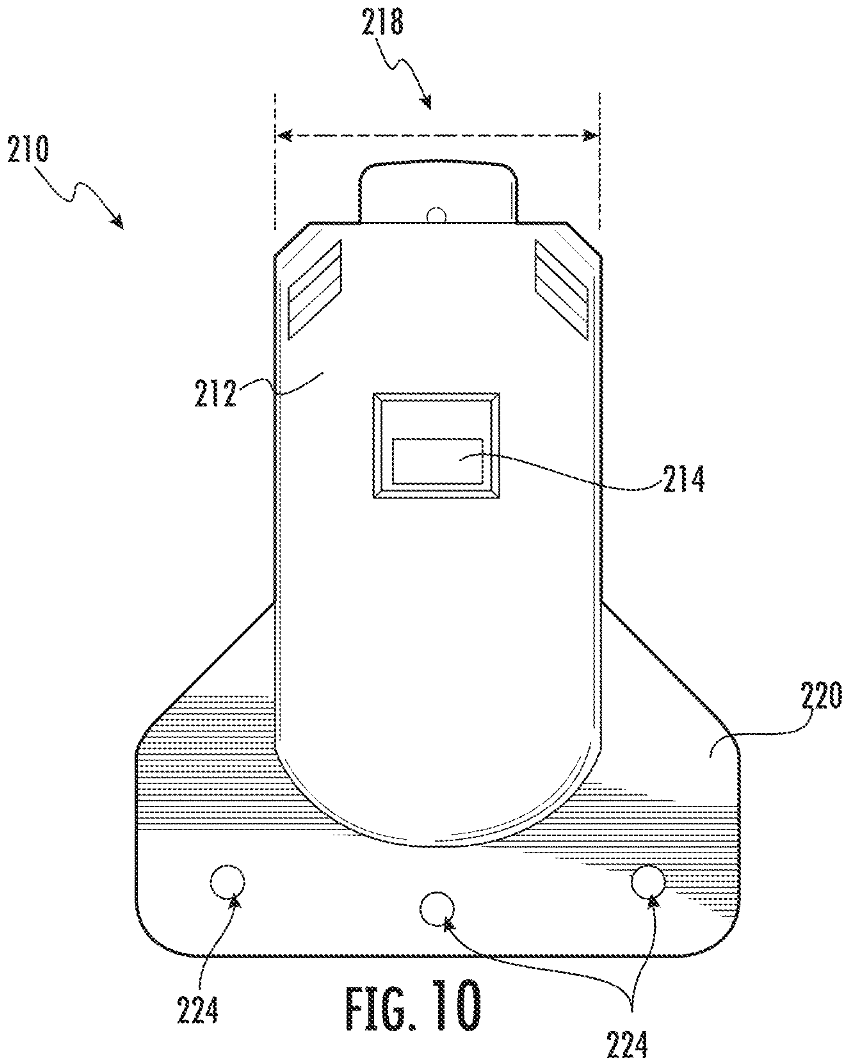
FIG. 10 is a front view of a coupling platform, according to an exemplary embodiment.
Figure 11:
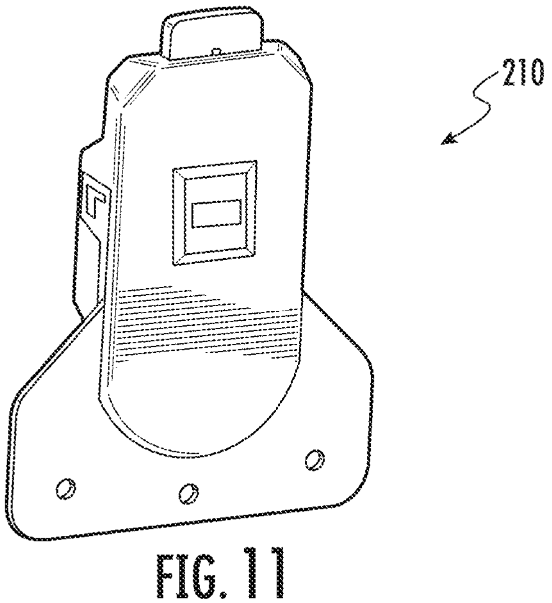
FIG. 11 is a perspective view of the coupling platform of FIG. 10, according to an exemplary embodiment.

Referring to FIG. 10, in various embodiments, coupling element 220 includes one or more apertures 224, configured to facilitate coupling an object to coupling platform 210.

Figure 12:
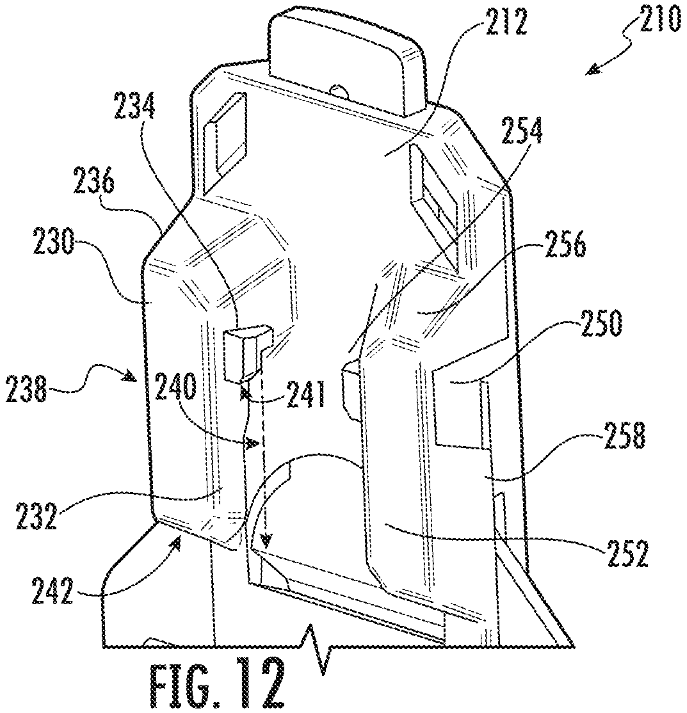
FIG. 12 is a perspective view from behind of the coupling platform of FIG. 10, according to an exemplary embodiment.
Figure 13:
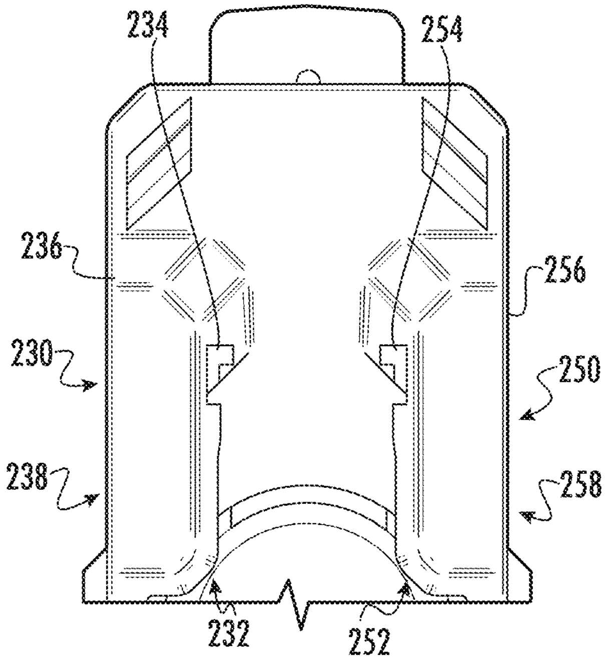
FIG. 13 is a rear view of the coupling platform of FIG. 10, according to an exemplary embodiment.
Figure 14:
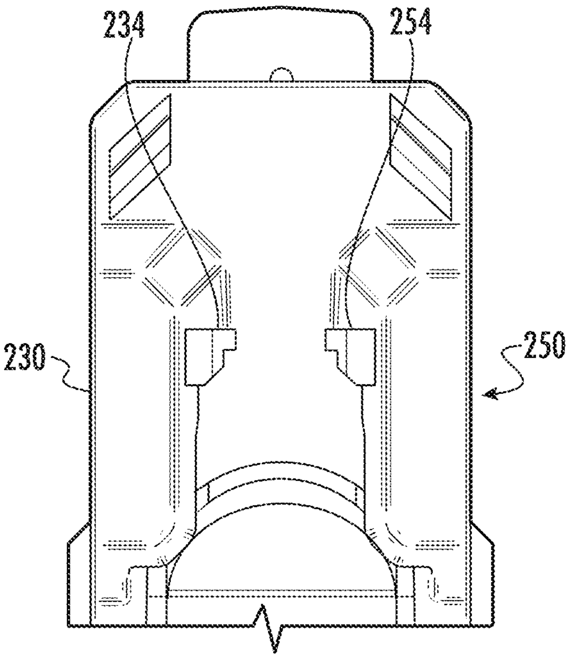
FIG. 14 is a rear view of the coupling platform of FIG. 10, according to an exemplary embodiment.

Referring to FIGS. 12-14, coupling platform 210 includes body 212, first wall 230, and second wall 250, first wall 230 and second wall 250 extending from body 212. First tongue 232 extends from first wall 230 towards second wall 250, and second tongue 252 extends from second wall 250 towards first wall 230. In various embodiments first tongue 232 and second tongue 252 are offset body body 212.

First wall 230 includes an upper portion 236 and a lower portion 238, and second wall 250 includes an upper portion 256 and a lower portion 258. In various embodiments, the upper portions are closer to the other wall than the lower portions (e.g., upper portion 236 is closer to second wall 250 than lower portion 238). In various embodiments, first tongue 232 extends from the first lower portion 238 towards the second wall 250.

Referring to FIG. 12, first channel 240 is defined at least in part by first wall 230 (e.g., lower portion 238), body 212, and first tongue 232. First channel 240 extends from a first closed end 241 proximate the upper portion 236 to a second open end 242.

It will be understood that in various embodiments, second wall 250 is symmetrical with respect to first wall 230, second tongue 252 is symmetrical with respect to first tongue 232, and second locking element 254 is symmetrical with respect to first locking element 234. Thus, it will be understood that all descriptions of one side of coupling platform 210 (e.g., first wall 230, first tongue 232, first locking element 234) are equally descriptive of the other side of coupling platform 210.

Coupling platform 210 includes first locking element 234 and second locking element 254 coupled to first wall 230 and second wall 250, respectively. First locking element 234 and second locking element 254 are configured to actuate between an unlocked position (FIG. 13) and a locked position (FIG. 14). When in the locked position, first locking element 234 and second locking element 254 are configured to interface with an element of an object coupled to coupling platform 210, thereby biasing the object to remain coupled to coupling platform 210. When in the locked position (FIG. 14), first locking element 234 and second locking element 254 are closer together than in the unlocked position (FIG. 13). Stated another way, when in the locked position (FIG. 14), first locking element 234 is closer to second wall 250 and second locking element 254 is closer to first wall 230 than in the unlocked position (FIG. 13). In various embodiments, when in the locked position first locking element 234 extends from upper portion 236 of first wall 230 and second locking element 254 extends from upper portion 256 of second wall 250.

Figure 15:
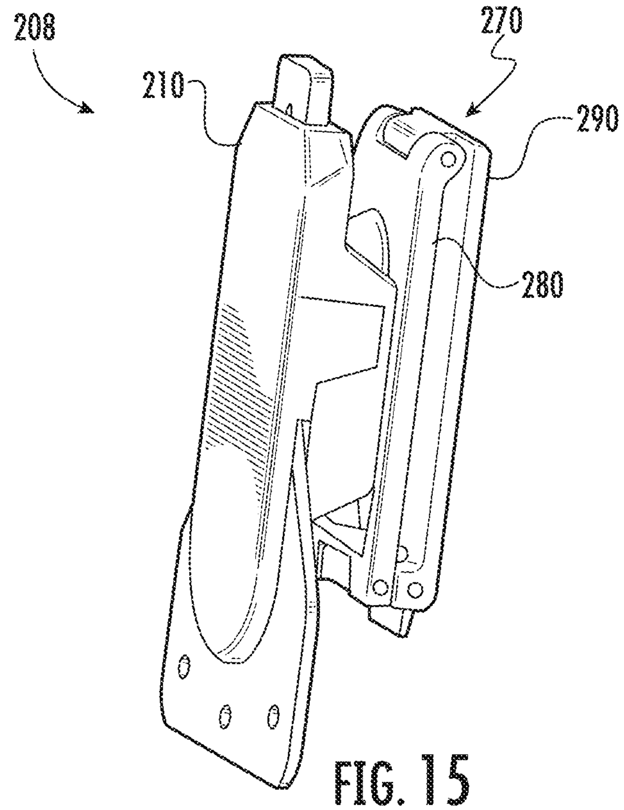
FIG. 15 is a perspective view of the coupling platform of FIG. 10 coupled to a belt clip, according to an exemplary embodiment.
Figure 16:
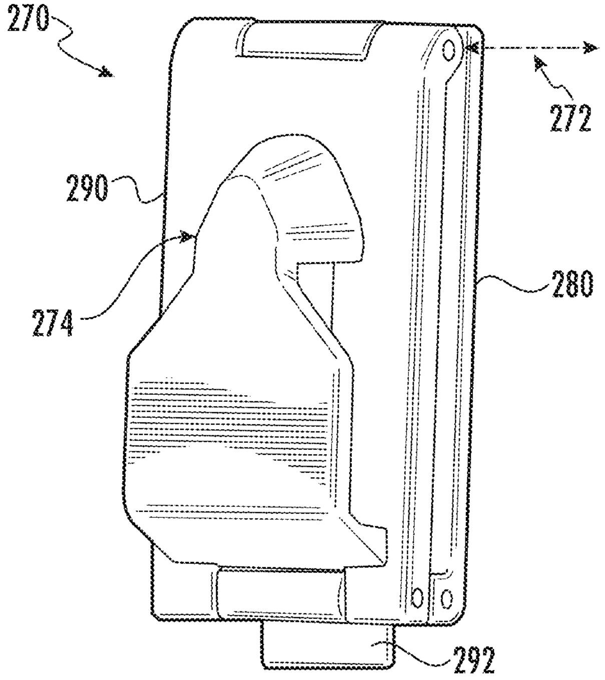
FIG. 16 is a perspective view of the belt clip of FIG. 15, according to an exemplary embodiment.
Figure 17:
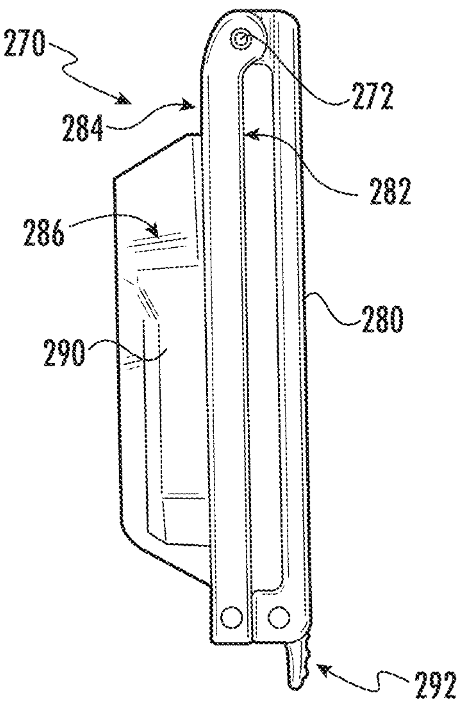
FIG. 17 is a side view of the belt clip of FIG. 15, according to an exemplary embodiment.
Figure 18:
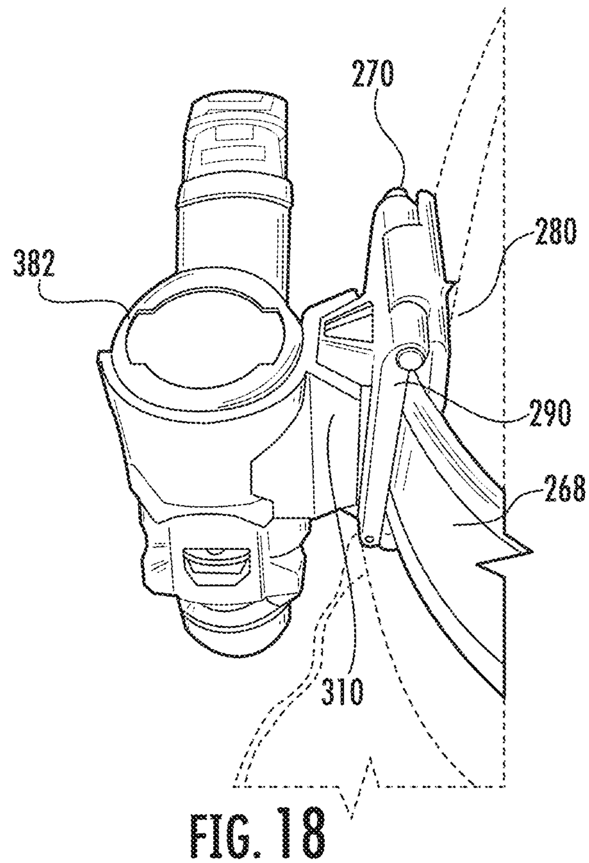
FIG. 18 is a perspective view of a coupling platform and a belt clip, according to an exemplary embodiment.

Referring to FIGS. 15-17, various aspects of coupling system 208 are shown. In various embodiments, coupling system 208 includes coupling platform 210 and support platform 270. Coupling platform 210 is shown coupled to a support platform 270. Support platform 270 is configured to mechanically reversibly couple and decouple with belt 268. Coupling platform 210 is configured to detachably couple with support platform 270, and coupling platform 210 is configured to be coupled to an object, such as a power drill. Thus, coupling platform 210 and support platform 270 are configured to collectively detachably couple an object to a belt being worn by a user.

Support platform 270 includes inner plate 280 and outer plate 290. Inner plate 280 defines an internal surface 282 and an opposing external surface 284. In various embodiments, inner plate 280 is coupled to outer plate 290, such as pivotally coupled such that inner plate 280 pivots about axis 272 with respect to outer plate 290. Outer plate 290 actuates between an open configuration and a closed configuration with respect to the inner plate 280, the internal surface 282 of the inner plate 280 facing towards the outer plate 290 when the outer plate is in the closed configuration with respect to the inner plate 280. Base 286 of support element 274 extends from external surface 284.

Latch 292 detachably couples lower portions of inner plate 280 and outer plate 290 to maintain outer plate 290 in the closed configuration with respect to the inner plate 280. In use, to couple support platform 270 to belt 268, latch 292 is actuated to decouple lower portions of inner plate 280 and outer plate 290. Inner plate 280 and outer plate 290 are pivotally opened and outer plate 290 is slid between belt 268 and the user. Then, inner plate 280 and outer plate 290 are pivoted closed until latch 292 couples lower portions of inner plate 280 and outer plate 290.

Referring to FIGS. 16-17, in various embodiments support platform 270 includes support element 274. Support element 274 is functionally and/or structurally the same as support element 150 except as otherwise noted.

Referring to FIGS. 18-21, various aspects of coupling platform 310 and support platform 270 are shown. Coupling platform 310 is substantially the same as coupling platform 210 except for the differences discussed herein. In particular, coupling platform 310 includes detents 340 rather than actuating locking elements 234, 254.

Figure 19:
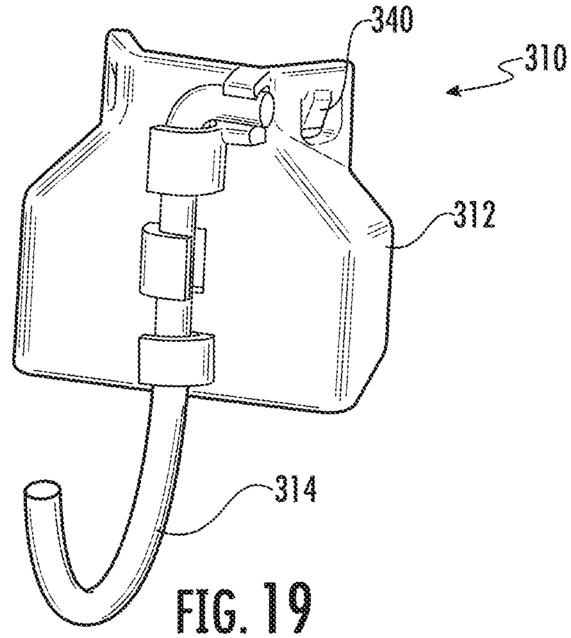
FIG. 19 is a perspective view of the coupling platform of FIG. 18, according to an exemplary embodiment.
Figure 20:
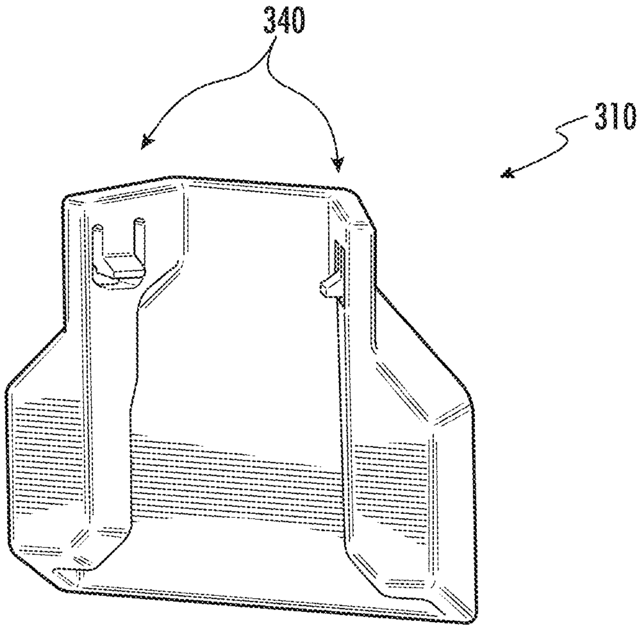
FIG. 20 is a rear view of the coupling platform of FIG. 18, according to an exemplary embodiment.

Referring to FIG. 19-20, detents 340 include upper surface 342, facing upward, and lower surface 344, facing downward. In various embodiments, upper surface 342 is angled and faces upward and inward to facilitate decoupling coupling platform 310 from support element 150. In particular, the angled upper surface 342 biases detent away from support element 150 when coupling platform 310 is being moved upward with respect to support element 150.

Figure 21:
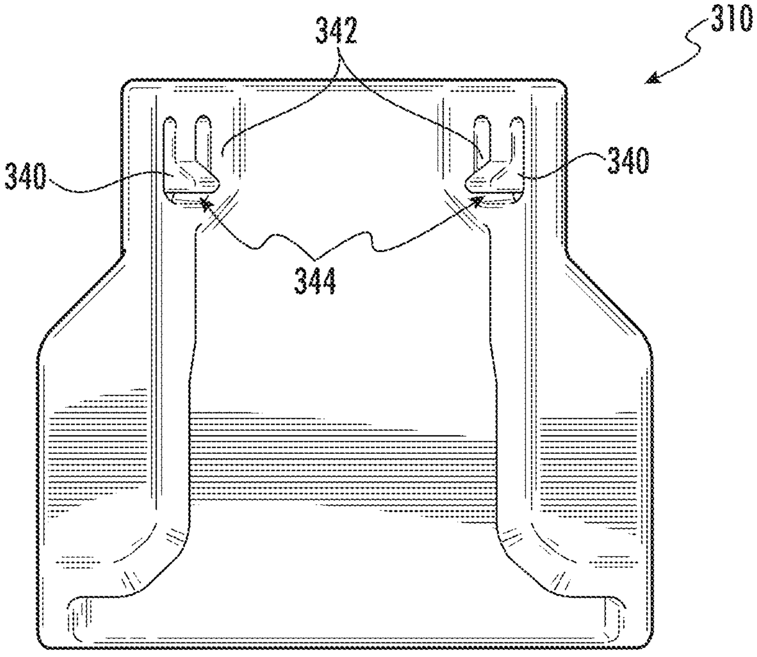
FIG. 21 is a perspective view of the coupling platform of FIG. 18, according to an exemplary embodiment.
Figure 22:
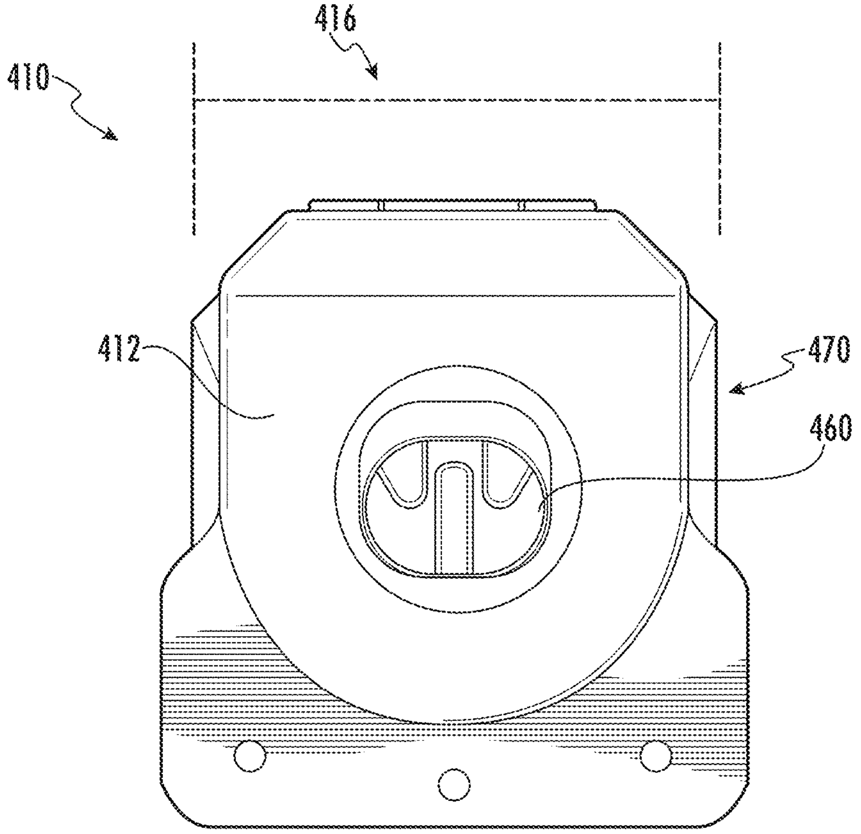
FIG. 22 is a perspective view of a coupling platform and a belt clip, according to an exemplary embodiment.
Figure 23:
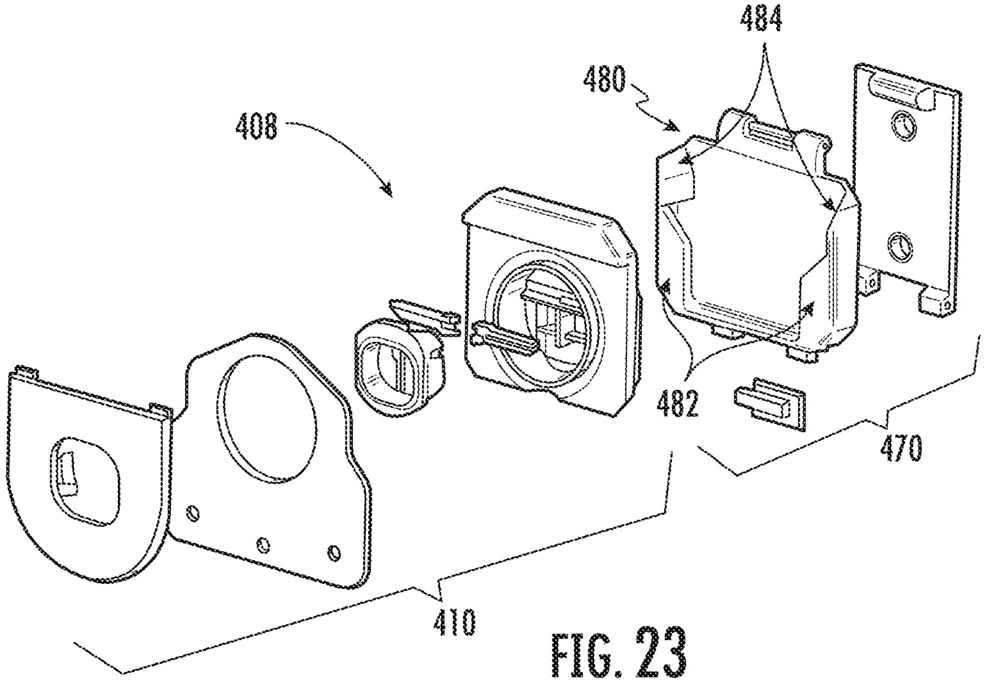
FIG. 23 is an exploded perspective view of the coupling platform and the belt clip of FIG. 22, according to an exemplary embodiment.
Figure 24:
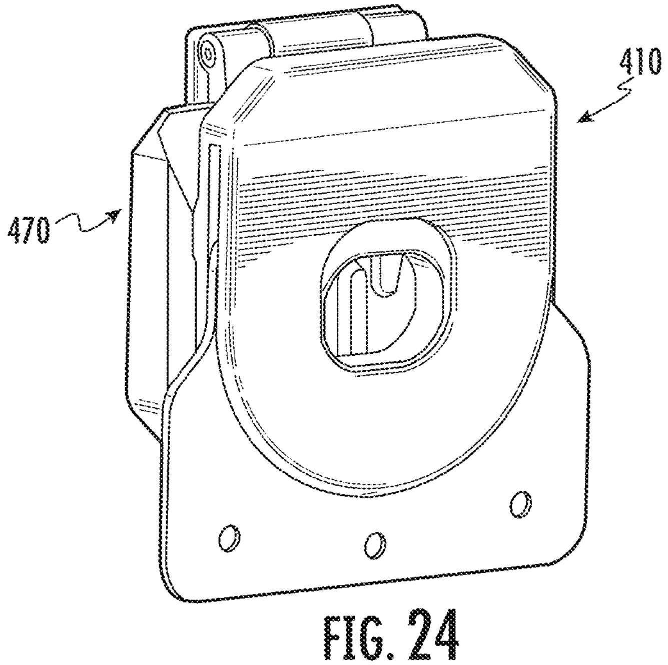
FIG. 24 is a perspective view of the coupling platform and the belt clip of FIG. 22, according to an exemplary embodiment.
Figure 25:
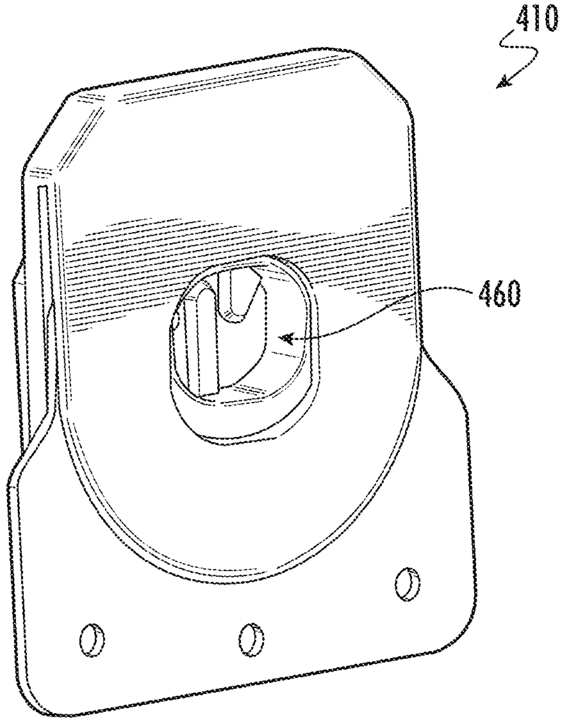
FIG. 25 is a perspective view of the coupling platform of FIG. 22, according to an exemplary embodiment.
Figure 26:
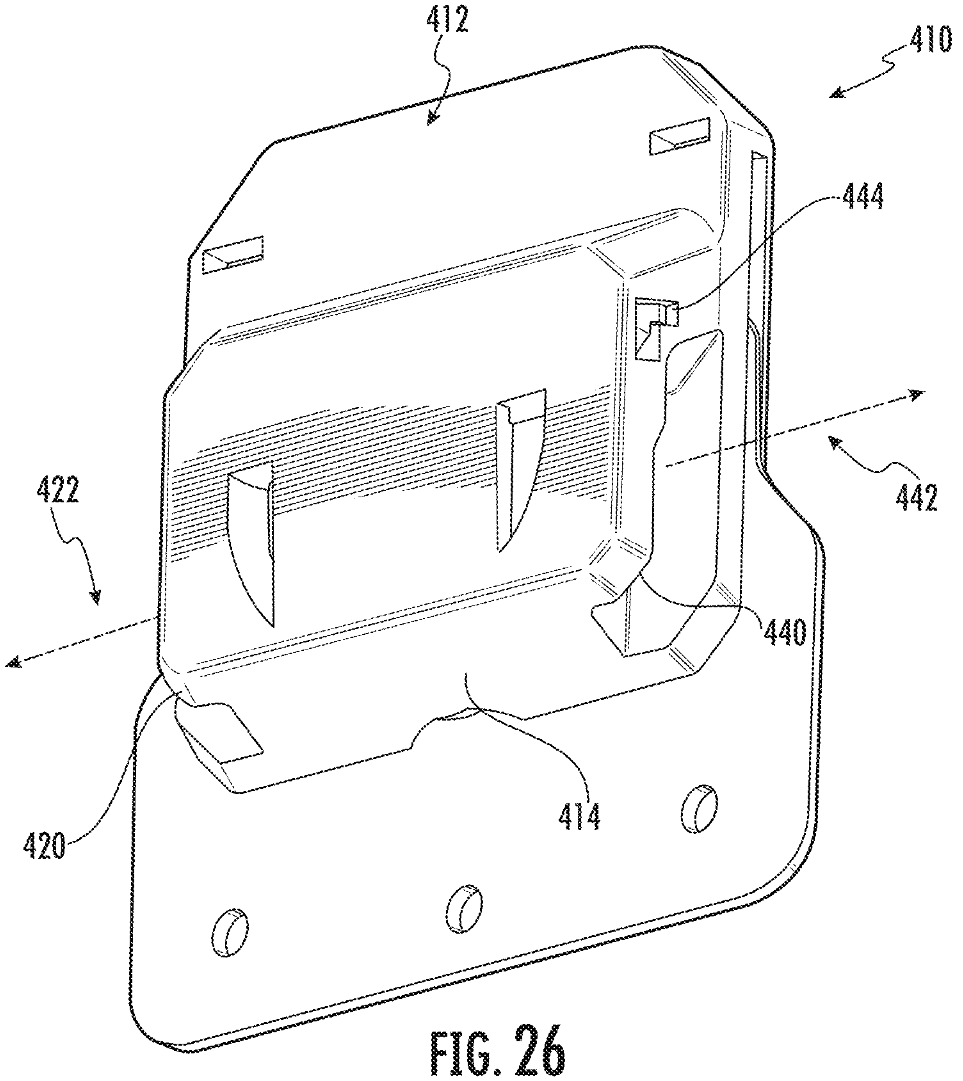
FIG. 26 is a perspective view of the coupling platform of FIG. 22, according to an exemplary embodiment.
Figure 27:
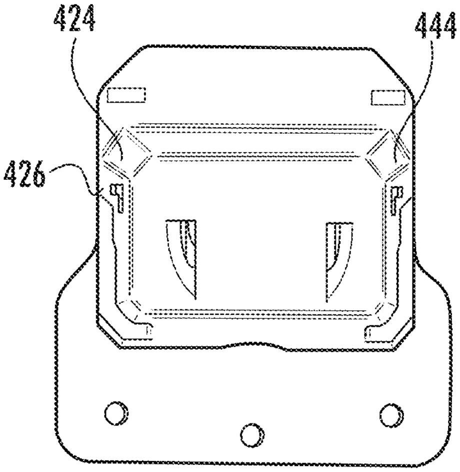
FIG. 27 is a rear view of the coupling platform of FIG. 22, according to an exemplary embodiment.
Figure 28:
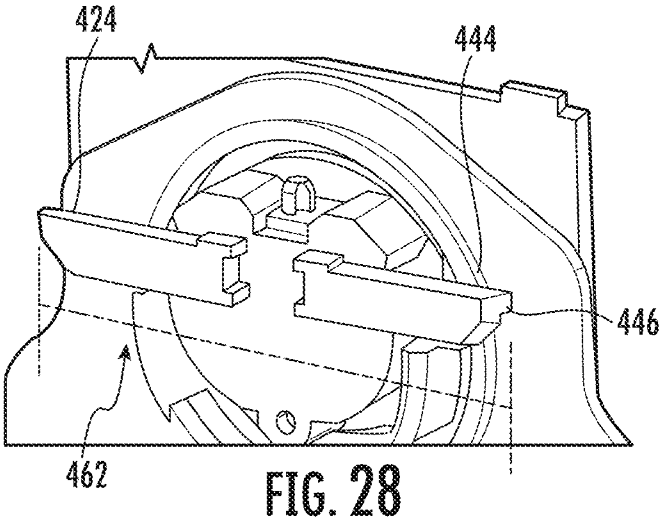
FIG. 28 is a ghost perspective view of the coupling platform of FIG. 22, according to an exemplary embodiment.

Referring to FIG. 21, coupling platform 310 includes body 312 and hook 314 coupled to body 312. Hook 314 is configured to couple and support objects, such as when coupling platform 310 is coupled to mounting system 110.

Referring to FIGS. 22-30, various aspects of coupling system 408, including coupling platform 410 and support platform 470, are shown. Coupling platform 410 is substantially the same as coupling platform 210 or coupling platform 310 except for the differences discussed herein. Support platform 470 is substantially the same as support platform 270 except for the differences discussed herein. In particular, support platform 470 includes cleat pocket 480 with ribs 482 extending towards each other, which is different than support platform 270 that includes outer plate 290 with two ribs extending away from each other (similar to support element 150). Further, support platform 470 includes locking walls 484 above ribs 482.

As will be explained, latch 460 is configured to actuate between a locked position and an unlocked position. When in the locked position, latch 460 biases coupling platform 410 to remain coupled to other coupling mechanisms, such as support elements 150.

Body 412 of coupling platform 410 defines width 416 that is greater than width 218 of coupling platform 210. In particular, in various embodiments width 416 is between 80 mm and 110 mm, and more specifically is between 90 mm and 100 mm, and more specifically is 94 mm.

Coupling platform 410 includes body 412 and wall 414 extending outwardly from body 412. First tongue 420 extends in direction 422 from wall 414, and second tongue 440 extends from wall 414 in direction 442 opposite direction 422.

Referring to FIGS. 27-30, various aspects of the locking mechanism of coupling platform 410 are shown. First locking element 424 and second locking element 444 are coupled to coupling platform 410, such as to first tongue 420 and second tongue 440, respectively.

Figure 29:
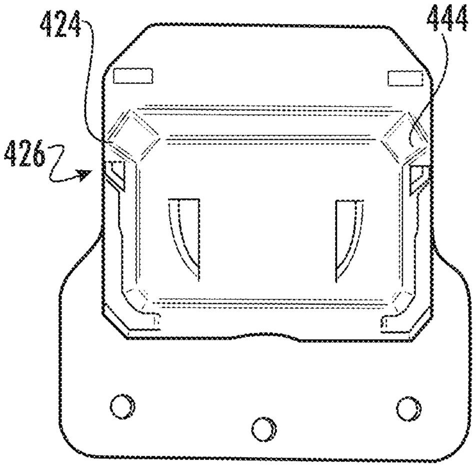
FIG. 29 is a rear view of the coupling platform of FIG. 22, according to an exemplary embodiment.
Figure 30:
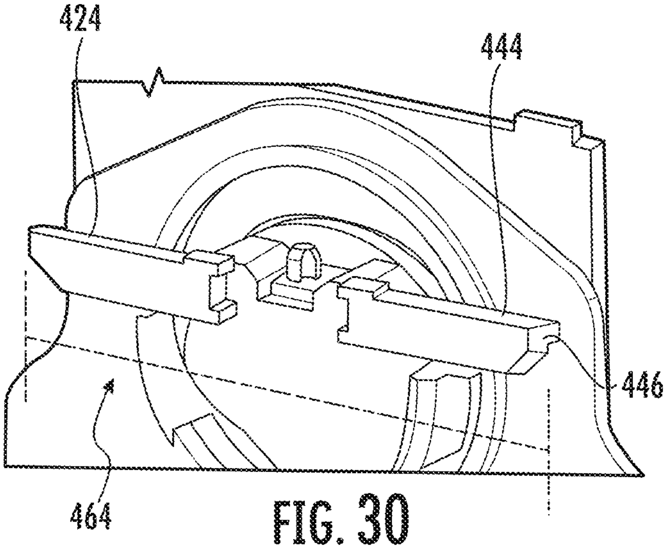
FIG. 30 is a ghost perspective view of the coupling platform of FIG. 22, according to an exemplary embodiment.

First locking element 424 and second locking element 444 are each configured to actuate between an unlocked position (FIGS. 27-28) and a locked position (FIGS. 29-30). When in the unlocked position, outer surface 426 of first locking element 424 and outer surface 446 of second locking element 444 define a first width 462 that is less than the second width 464 when in the locked position. Stated another way, when first locking element 424 and second locking element 444 are actuated from the locked position to the unlocked position, first locking element 424 and second locking element 444 slide away from each other. When first locking element 424 and second locking element 444 are in the locked position, one or both of first locking element 424 and second locking element 444 interface with locking walls 484 to bias coupling platform 410 to remain coupled to support platform 470.

Figure 31:
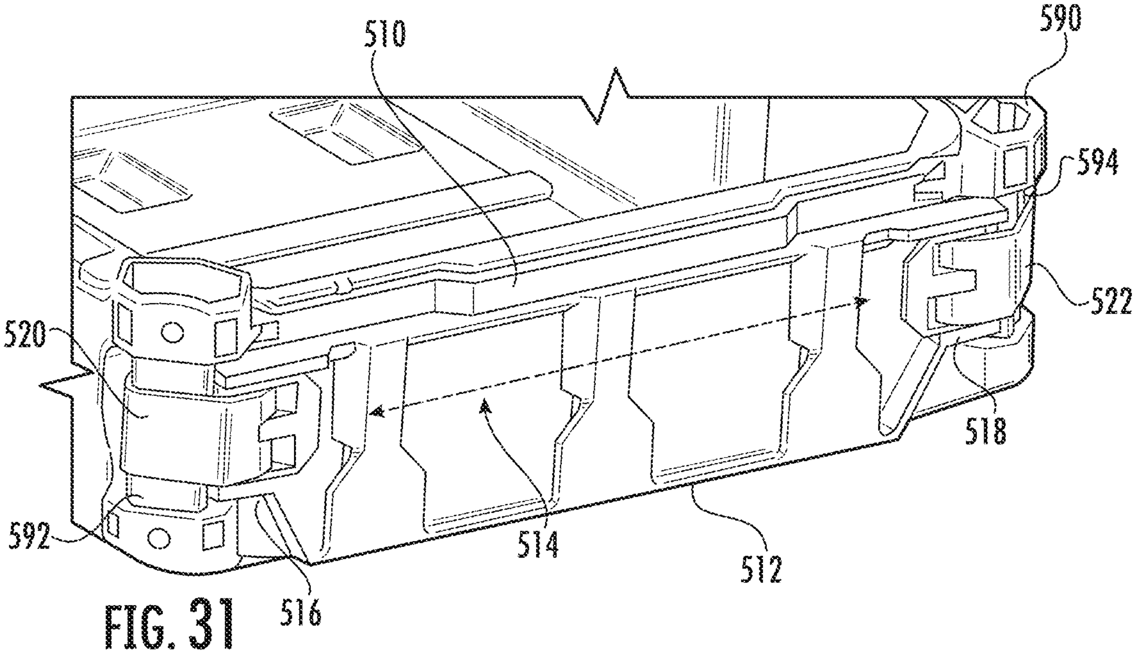
FIG. 31 is a perspective view of a mounting platform, according to an exemplary embodiment.
Figure 32:
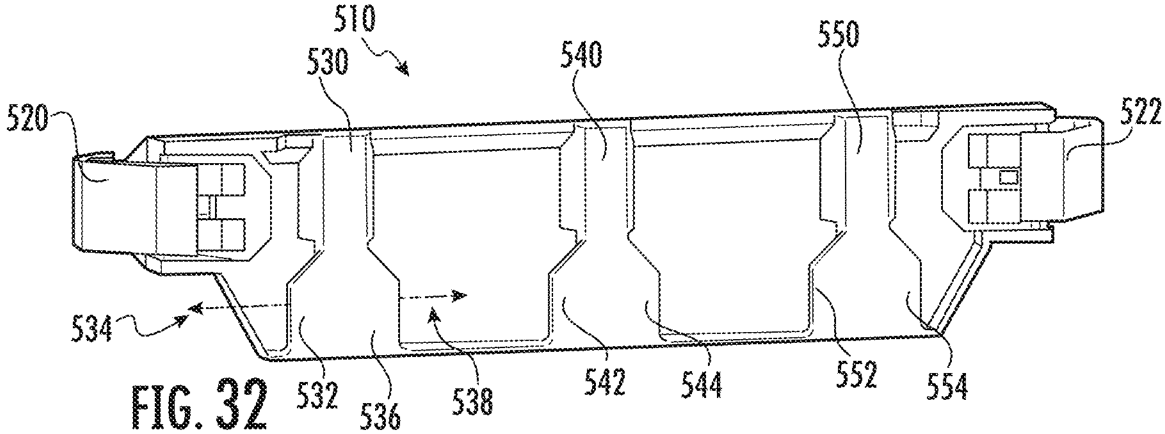
FIG. 32 is a front view of the mounting platform of FIG. 31, according to an exemplary embodiment.
Figure 33:
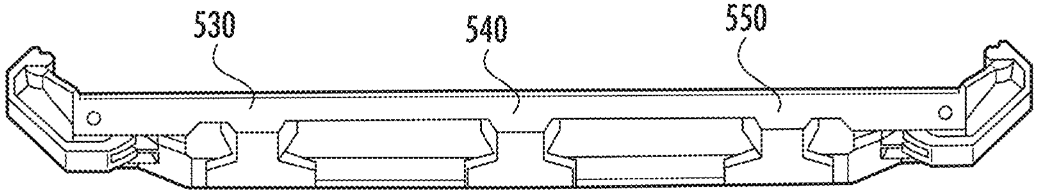
FIG. 33 is a top view of the mounting platform of FIG. 31, according to an exemplary embodiment.

Referring to FIGS. 31-33, various aspects of mounting platform 510 are shown. Mounting platform 510 includes base 512 extending along longitudinal axis 514 between first end 516 and second end 518.

First coupling element 520 is coupled to first end 516, and second coupling element 522 is coupled to second end 518. First coupling element 520 and second coupling element 522 are configured to couple to elongate structures, such as rail 592 and rail 594, respectively. In various embodiments of modular unit 590, rails 592, 594 extend vertically from corners of modular unit 590.

Mounting platform 510 includes first wall 530, second wall 540, and third wall 550. First tongue 532 extends from first wall 530 in first direction 534, and second tongue 536 extends from first wall 530 in second direction 538 opposite first direction 534. First tongue 532 and second tongue 536 are offset from base 512. Third tongue 542 and fourth tongue 544 extend from second wall 540, and fifth tongue 552 and sixth tongue 554 extend from third wall 550. In various embodiments, each of tongues are offset from base 512, thereby permitting objects to couple to mounting platform 510 between the tongues and base 512.

In various embodiments, first tongue 532 extends from the first wall 530 towards the first coupling element 520, and second tongue 536 extends from the first wall 530 towards second wall 540. In various embodiments, third tongue 542 extends from the second wall 540 towards the first wall 530, and fourth tongue 544 extends from the second wall 540 towards third wall 550. In various embodiments, fifth tongue 552 extends from the third wall 550 towards second wall 540, and sixth tongue 554 extends from the third wall 550 towards second coupling element 522.

Figure 34:
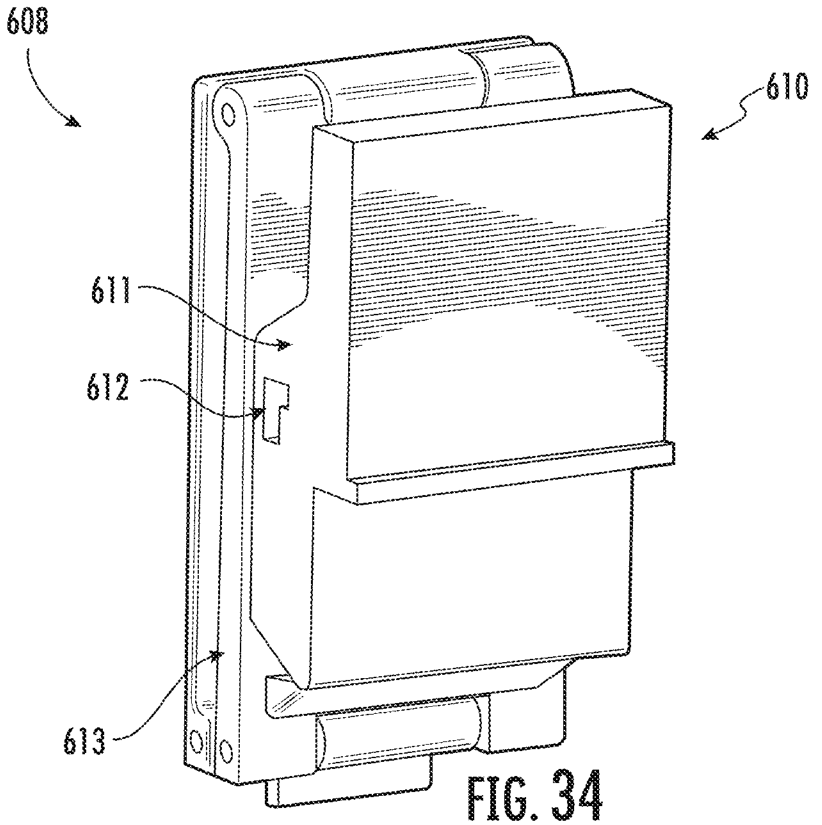
FIG. 34 is a ghost perspective view of a coupling platform, according to an exemplary embodiment.
Figure 35:
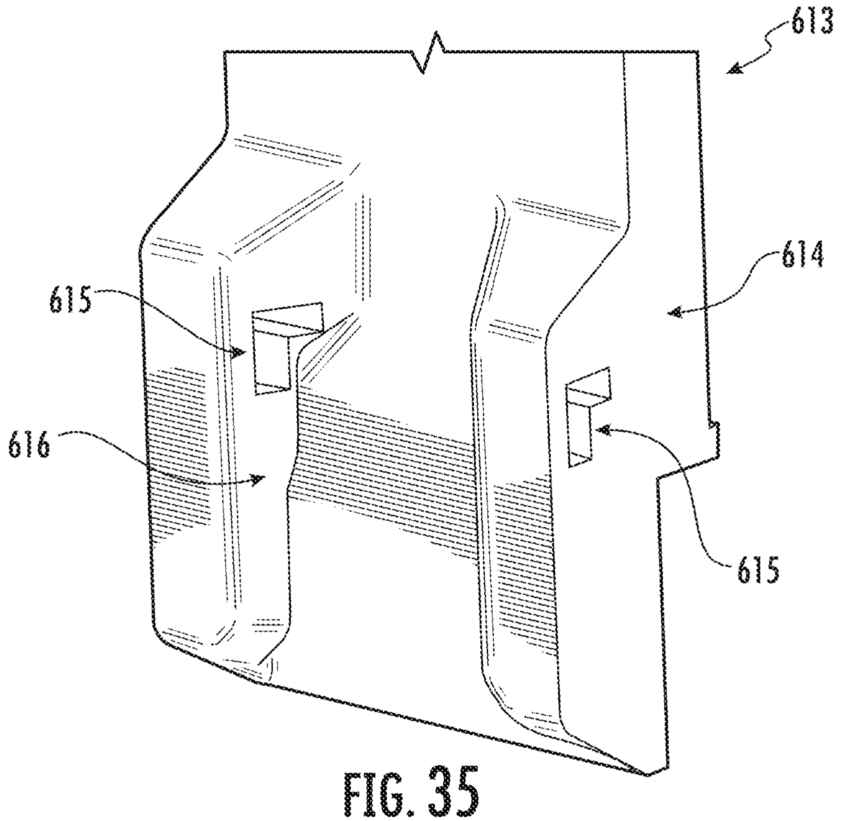
FIG. 35 is a perspective view of the coupling platform of FIG. 34, according to an exemplary embodiment.

Referring to FIGS. 34-35, various aspects of coupling system 608, including coupling platform 610 and support platform 613, are shown. Coupling system 608 is substantially the same as coupling system 208 except for the differences discussed herein. Coupling platform 610 is substantially the same as coupling platform 210 or coupling platform 310 except for the differences discussed herein. In particular, coupling platform 610 includes apertures 612 in the outer surfaces 611. Similarly, support platform 613 includes apertures 615 in outer surfaces 614. As a result, locking elements extending between the walls are configured to be actuated via an element extending through the outer apertures (e.g., instead of locking elements being actuated via an element extending through a bottom of the base). In various embodiments, apertures 612 are aligned with apertures 615 when support platform 613 is detachably coupled to coupling platform 610.

Figure 36:
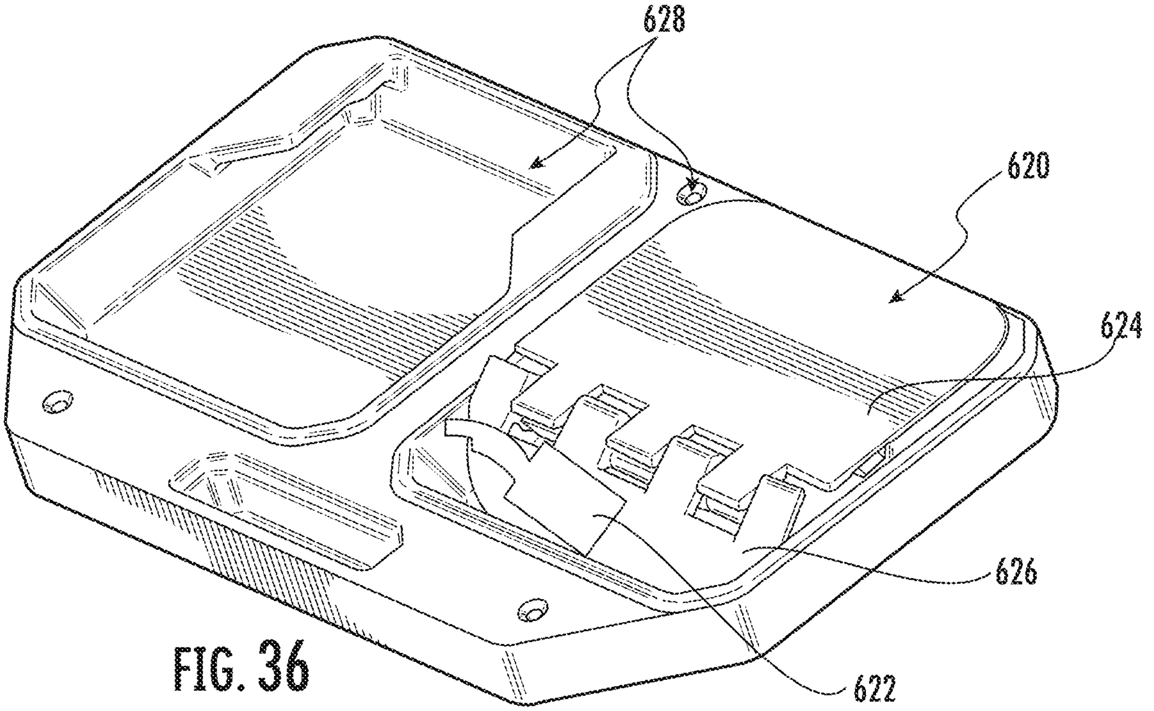
FIG. 36 is a perspective view of a coupling platform, according to an exemplary embodiment.
Figure 37:
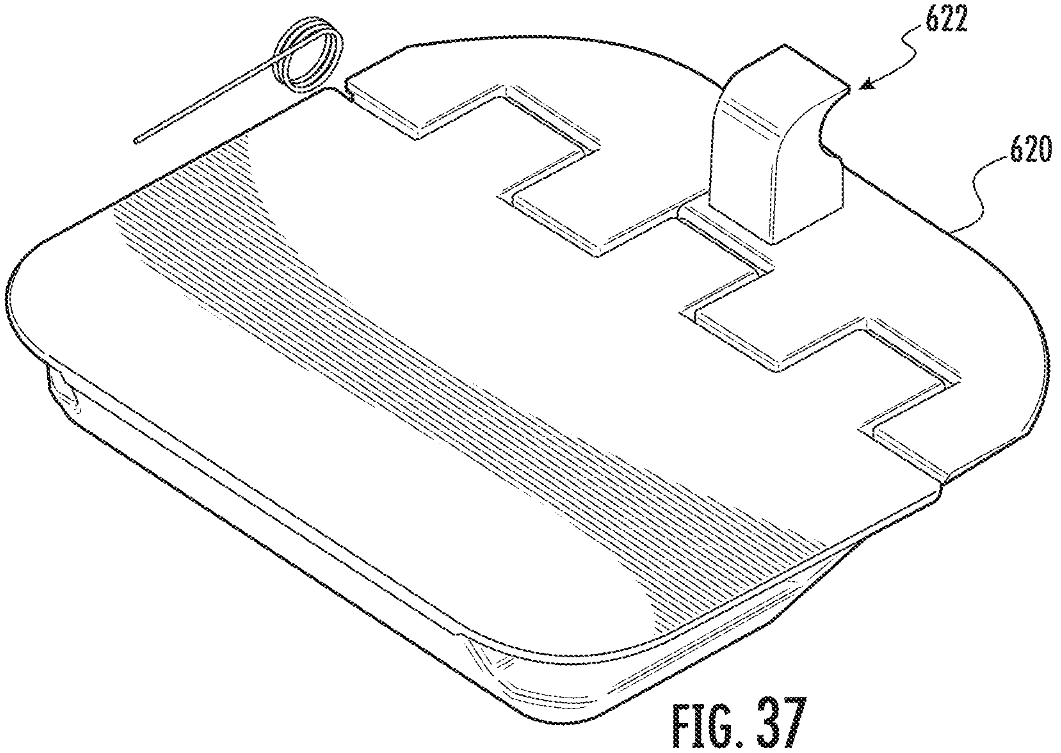
FIG. 37 is a perspective view of the coupling platform of FIG. 36, according to an exemplary embodiment.

Referring to FIGS. 36-37, various aspects of coupling platform 620 are shown. Coupling platform 620 is substantially the same as coupling platform 410 except for the differences discussed herein. In particular, coupling platform 620 includes a lower portion 624 pivotally coupled to an upper portion 626. The lower portion 624 is configured to detachably engage with a cleat pocket 628 (e.g., via engaging with the ribs extending above the recessed surface of cleat pocket 628). In various embodiments, a male coupler (e.g., similar to male coupler 394 of modular tool storage container 390) extends from a bottom of lower portion 624 and engages with ribs of cleat pocket 628). A handle 622 is coupled to upper portion 626, and the handle 622 is configured to be interfaced with by a user to remove coupling platform 620 from the cleat pocket (e.g., by pivoting upper portion 626 upward and away from the base of the cleat pocket and then sliding the lower portion 624 away from the cleat ribs until coupling platform 620 can be removed from the cleat pocket).

Figure 38:
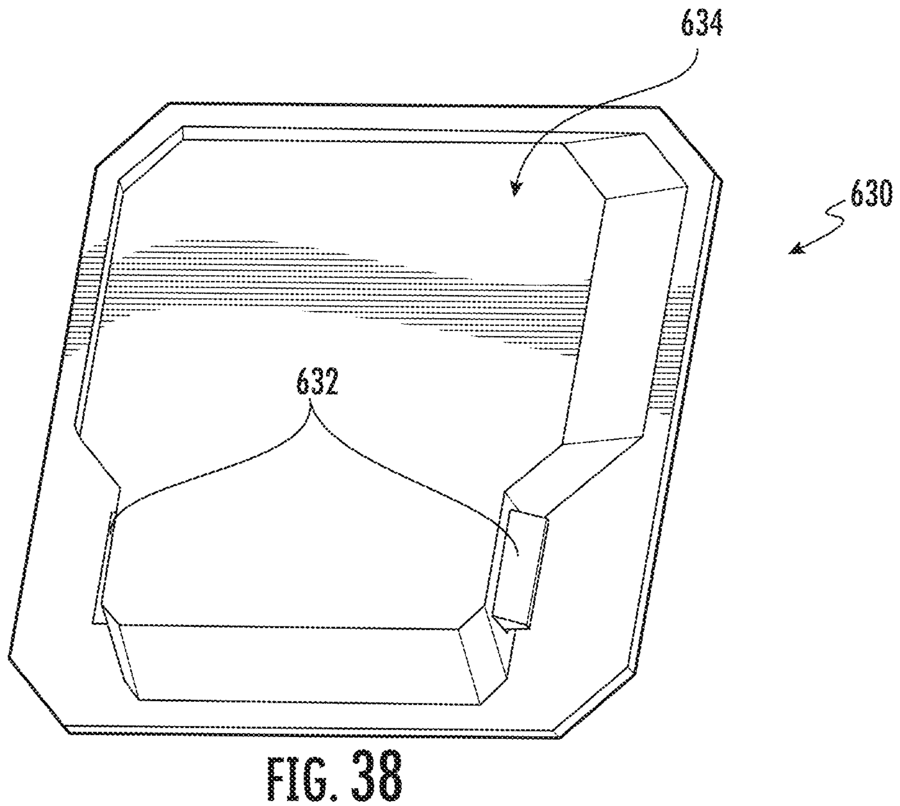
FIG. 38 is a perspective view of a coupling platform, according to an exemplary embodiment.
Figure 39:
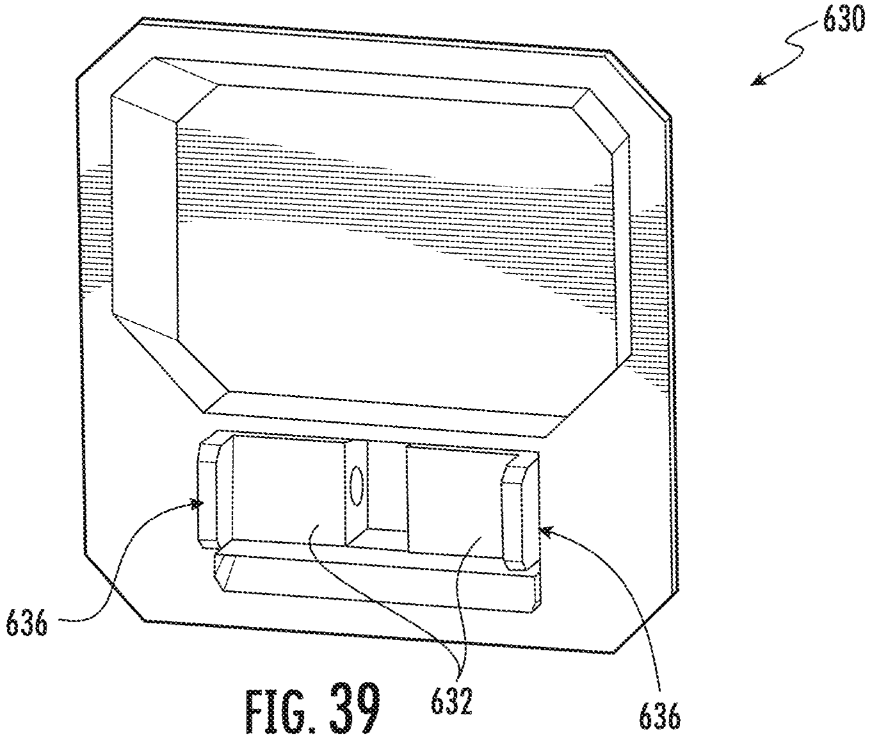
FIG. 39 is a perspective view of the coupling platform of FIG. 38, according to an exemplary embodiment.
Figure 40:
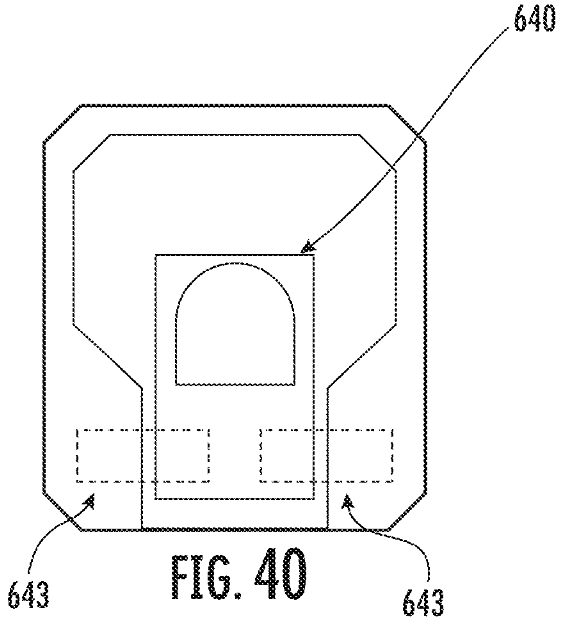
FIG. 40 is a schematic top view of a coupling platform, according to an exemplary embodiment.
Figure 41:
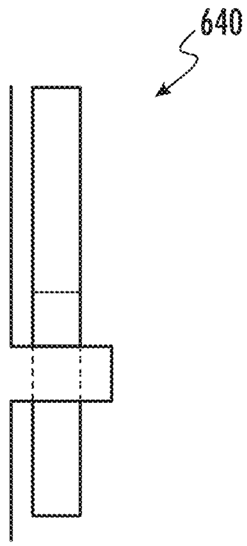
FIG. 41 is a schematic side view of the coupling platform of FIG. 40, according to an exemplary embodiment.
Figure 42:
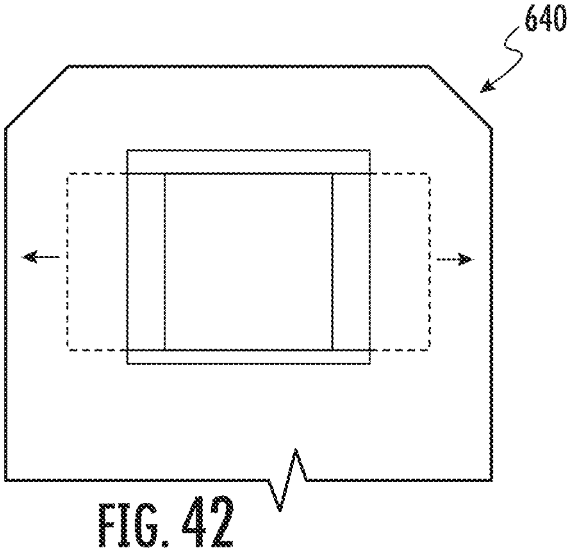
FIG. 42 is a schematic top view of the coupling platform of FIG. 40, according to an exemplary embodiment.

Referring to FIGS. 38-39, various aspects of coupling platform 630 are shown. Coupling platform 630 is configured to detachably couple with a cleat pocket, such as cleat pocket 628. Elements 632 are slidably coupled to base of coupling platform 630. Elements 632 slidably actuate with respect to base 634 between a locked configuration and an unlocked configuration. In use, elements 632 are actuated away from the base 634 (e.g., via the interface elements 636 shown in FIG. 39) until elements 632 engage under ribs of a cleat pocket (e.g., see cleat pocket 628 in FIG. 36), thereby securing coupling platform 630 to the cleat pocket. To remove the coupling platform 630, elements 632 are retracted at least partially into the base, thereby permitting coupling platform 630 to be removed from the cleat pocket.

Figure 43:
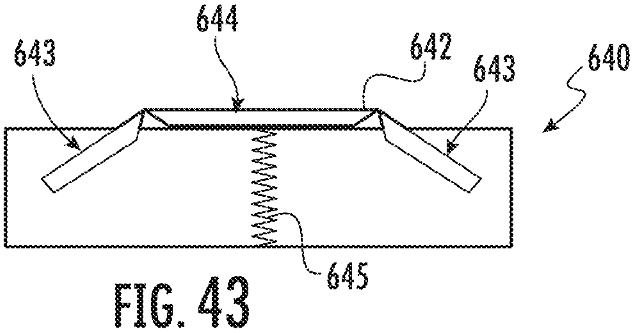
FIG. 43 is a schematic side view of the coupling platform of FIG. 40, according to an exemplary embodiment.
Figure 44:
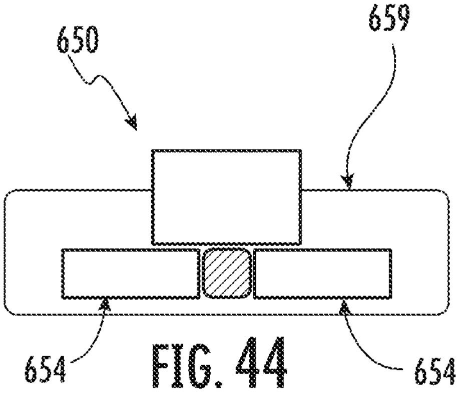
FIG. 44 is a schematic view of a coupling platform, according to an exemplary embodiment.
Figure 45:
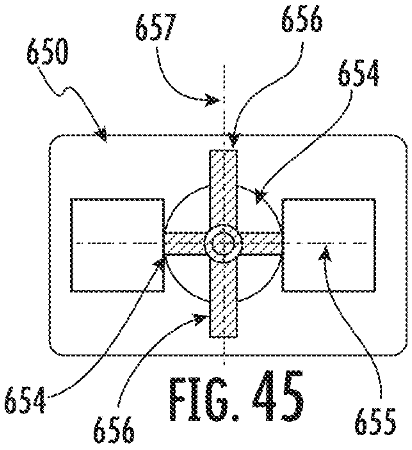
FIG. 45 is a schematic view of the coupling platform of FIG. 44, according to an exemplary embodiment.

Referring to FIGS. 40-43, various aspects of coupling platform 640 are shown. Coupling platform 640 is configured to detachably couple with a cleat pocket, such as cleat pocket 628. Coupling platform 640 includes a central portion 644 and two arms 643 pivotally coupled to the central portion 644 via hinges 642 (FIG. 43). The central portion is biased upward (away from the cleat pocket) by a biasing element, shown as spring 645. When the central portion 644 is pushed downward once the hinges 642 straighten and the arms 643 lock in place beneath the ribs of the cleat pocket. When the central portion 644 is pushed downward a second time, the arms 643 unlock and fold, thereby permitting coupling platform 640 to be decoupled and removed from the cleat pocket.

Figure 46:
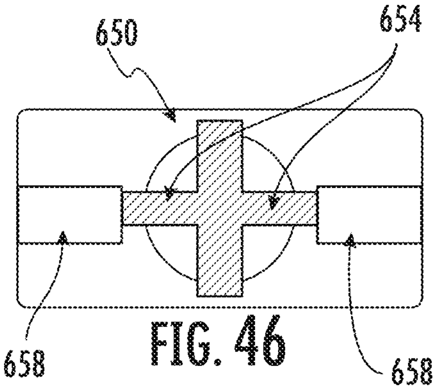
FIG. 46 is a schematic view of the coupling platform of FIG. 44, according to an exemplary embodiment.
Figure 47:
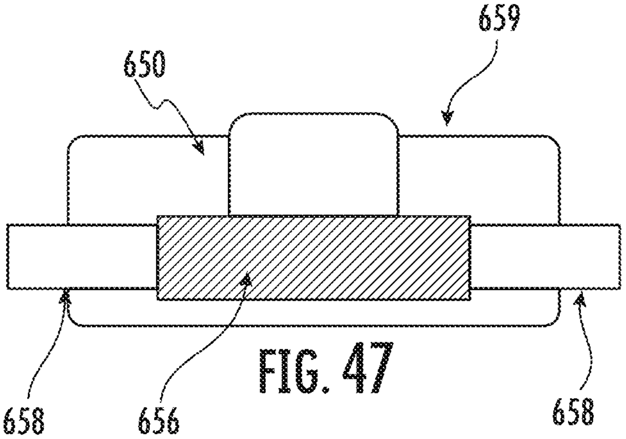
FIG. 47 is a schematic view of the coupling platform of FIG. 44, according to an exemplary embodiment.
Figure 48:
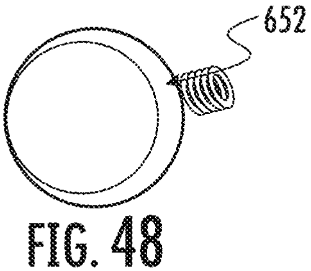
FIG. 48 is a schematic view of a portion of the coupling platform of FIG. 44, according to an exemplary embodiment.

Referring to FIGS. 44-48, various aspects of coupling platform 650 are shown. Coupling platform 650 is substantially the same as coupling platform 640 except for the differences discussed herein. In particular, coupling platform 650 includes short arms 654 extending along a first axis 655, and long arms 656 extending along a second axis 657 perpendicular to the first axis 655, and a cam. When cam is the unlocked position, short arms 654 extend laterally within body 659 and thus engaging arms 658 do not extend outside of body 659 (FIG. 46). When cam is in the locked position (FIG. 47), long arms 656 engage against engaging arms 658 and thus engaging arms 658 extend laterally outside of body 659, thereby securing coupling platform 650 under ribs of a cleat pocket (FIG. 47). Similar to coupling platform 640, in various embodiments coupling platform 650 includes an interface 652 that is spring-loaded and each press of the interface 652 actuates the cam between the locked and unlocked positions.

Figure 49:
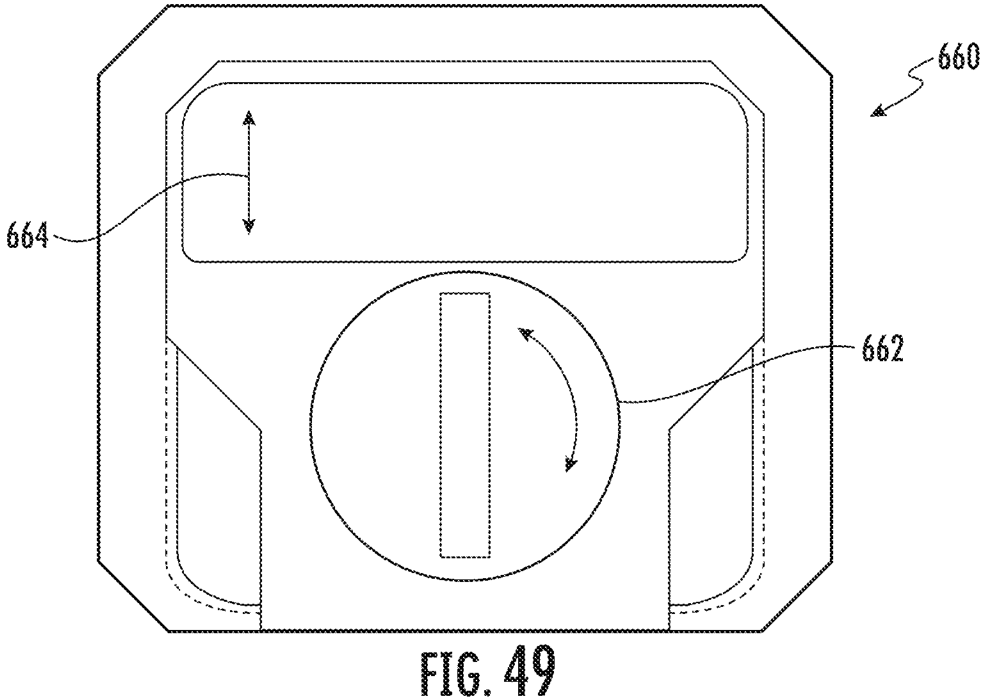
FIG. 49 is a schematic top view of a coupling platform, according to an exemplary embodiment.
Figure 50:
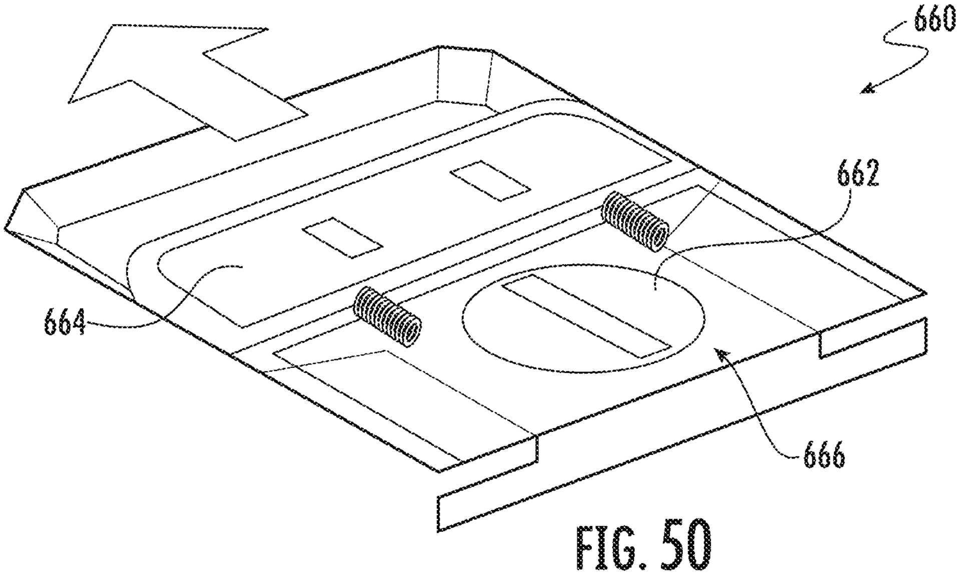
FIG. 50 is a schematic perspective view of the coupling platform of FIG. 49, according to an exemplary embodiment.

Referring to FIGS. 49-50, various aspects of coupling platform 660 are shown. Coupling platform 660 is substantially the same as coupling platform 640 or coupling platform 650 except for the differences discussed herein. In particular, rather than the interface 662 actuating a width of coupling platform 660, interface 662 actuates a length of coupling platform 660. As interface 662 is rotated, such as via each one-quarter turn of interface 662, bar 664 extends either away from or is retracted towards the base 666 of coupling platform 660. When bar 664 is fully extended away from base 666 of coupling platform 660, base 666 of coupling platform 660 extends under the ribs of the cleat, thereby locking coupling platform 660 with the cleat. When the bar 664 is retracted towards the base 666, the coupling platform 660 is permitted to be decoupled from the ribs of the cleat pocket and as a result coupling platform 660 can be removed from the cleat pocket. In a specific embodiment, coupling platform 640 includes base 666, interface 662 coupled to base 666 (e.g., rotatably coupled), a male coupler (similar to male coupler 394) extending from a bottom of base 666, and bar 664 slidably coupled to base. Rotatably actuating interface 662 causes bar 664 to slide with respect to base 666, thereby varying the length of coupling platform 660.

Figure 51:
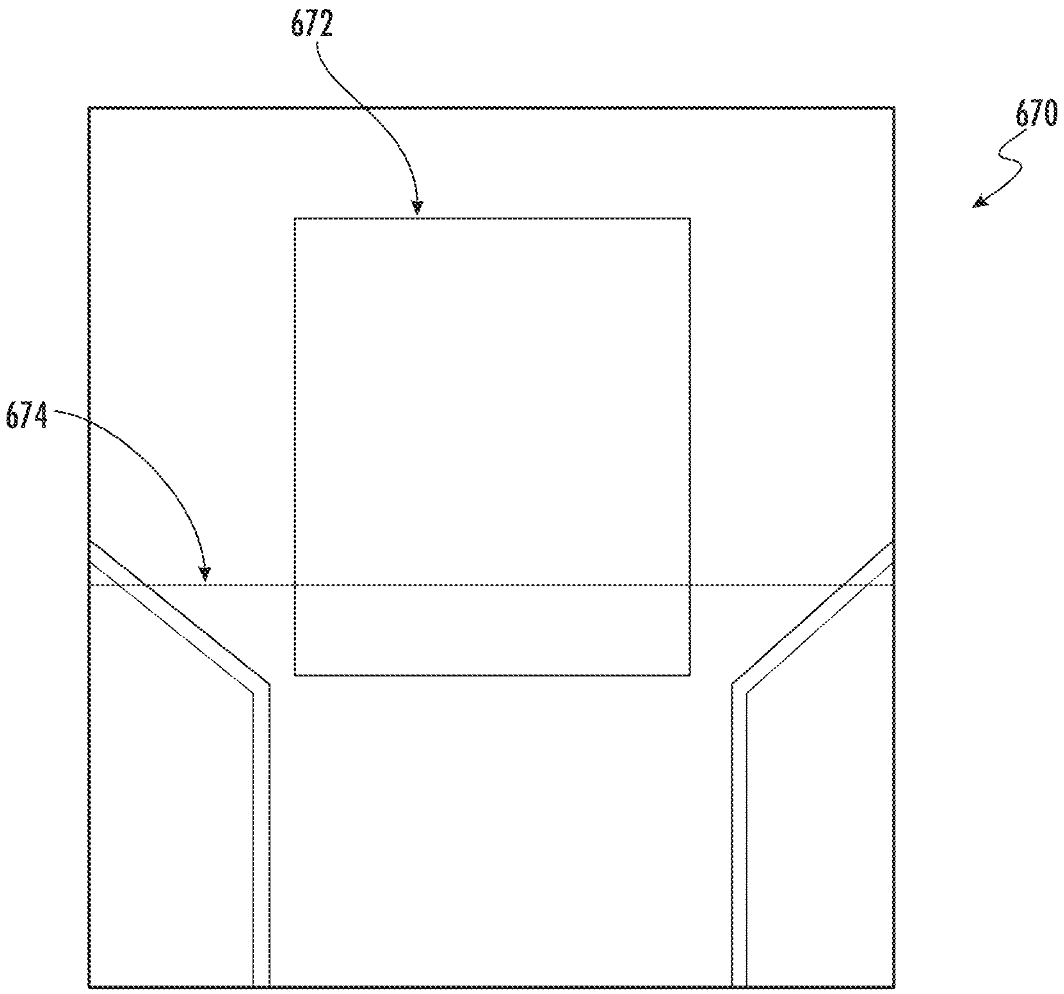
FIG. 51 is a schematic top view of a coupling platform, according to an exemplary embodiment.

Referring to FIG. 51, various aspects of coupling platform 670 are shown. Coupling platform 670 is substantially the same as coupling platform 660 or coupling platform 310 except for the differences discussed herein. In particular, coupling platform 670 includes two components and a spring (e.g., base 674 and plate 672). When the interface is actuated (e.g., pressed), a tilted plate (e.g., base 674) slides in towards the ribs of the cleat pocket to lock coupling platform 670 in place (e.g., via coming in contact with a top of a plate). In various embodiments, coupling platform 670 works best with a mounting plate.

Figure 52:
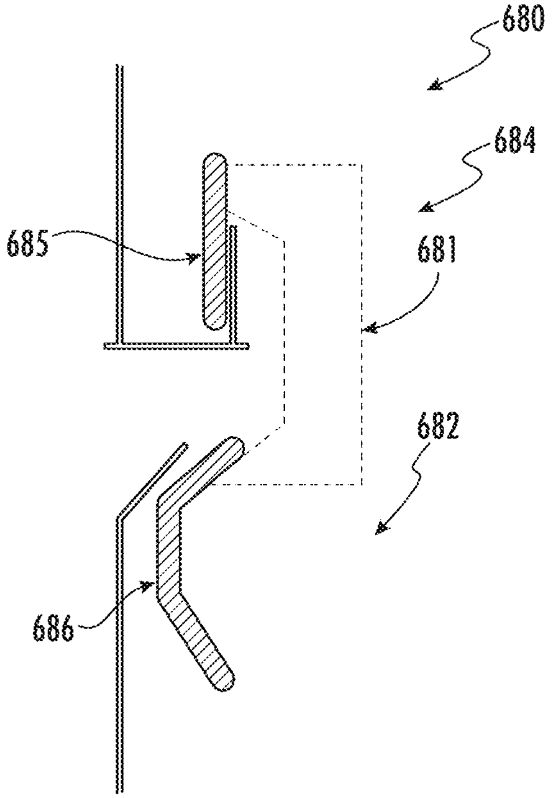
FIG. 52 is a schematic side view of a coupling platform, according to an exemplary embodiment.
Figure 53:
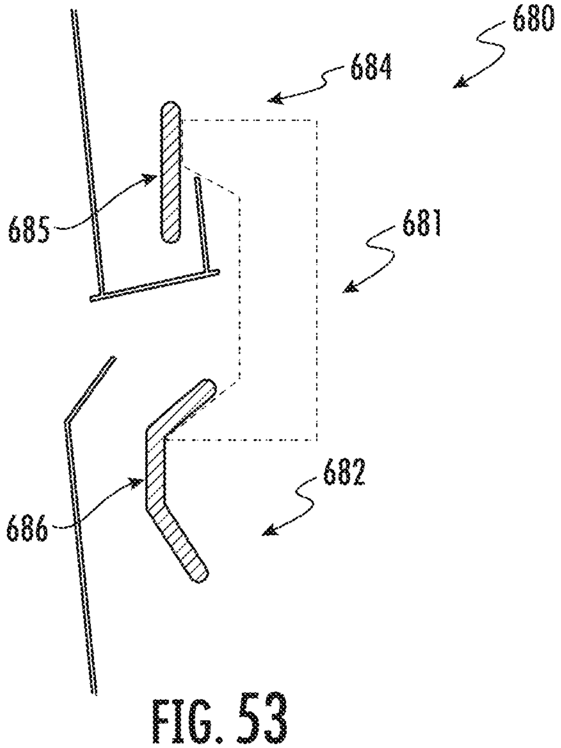
FIG. 53 is a schematic side view of the coupling platform of FIG. 52, according to an exemplary embodiment.

Referring to FIGS. 52-53, various aspects of coupling platform 680 are shown. Coupling platform 680 interfaces with ribs of a cleat to hook against the ribs, thereby securing the coupling platform 680 to the cleat pocket 684 and/or the top of the next cleat pocket 682. In a specific embodiment, coupling platform 680 includes body 681 (shown schematically), first coupling element 685 coupled to a first portion of body 681, and second coupling element 686 coupled to a second portion of body 681.

In various embodiments, coupling platform 680 is configured to be coupled to two cleat pockets simultaneously. In particular, first coupling element 685 (e.g., a planar wall) is first inserted into a cleat pocket 684 beneath the ribs, then coupling platform 680 is rotated such that second coupling element 686 moves towards a neighboring cleat pocket 682 until second coupling element 686 (e.g., a curved wall convex with respect to cleat pocket 682) is inserted into the cleat pocket 682. To remove coupling platform 680, coupling platform is rotated in the reverse direction (e.g., second coupling element 686 is first rotated out of cleat pocket 682).

Figure 54:
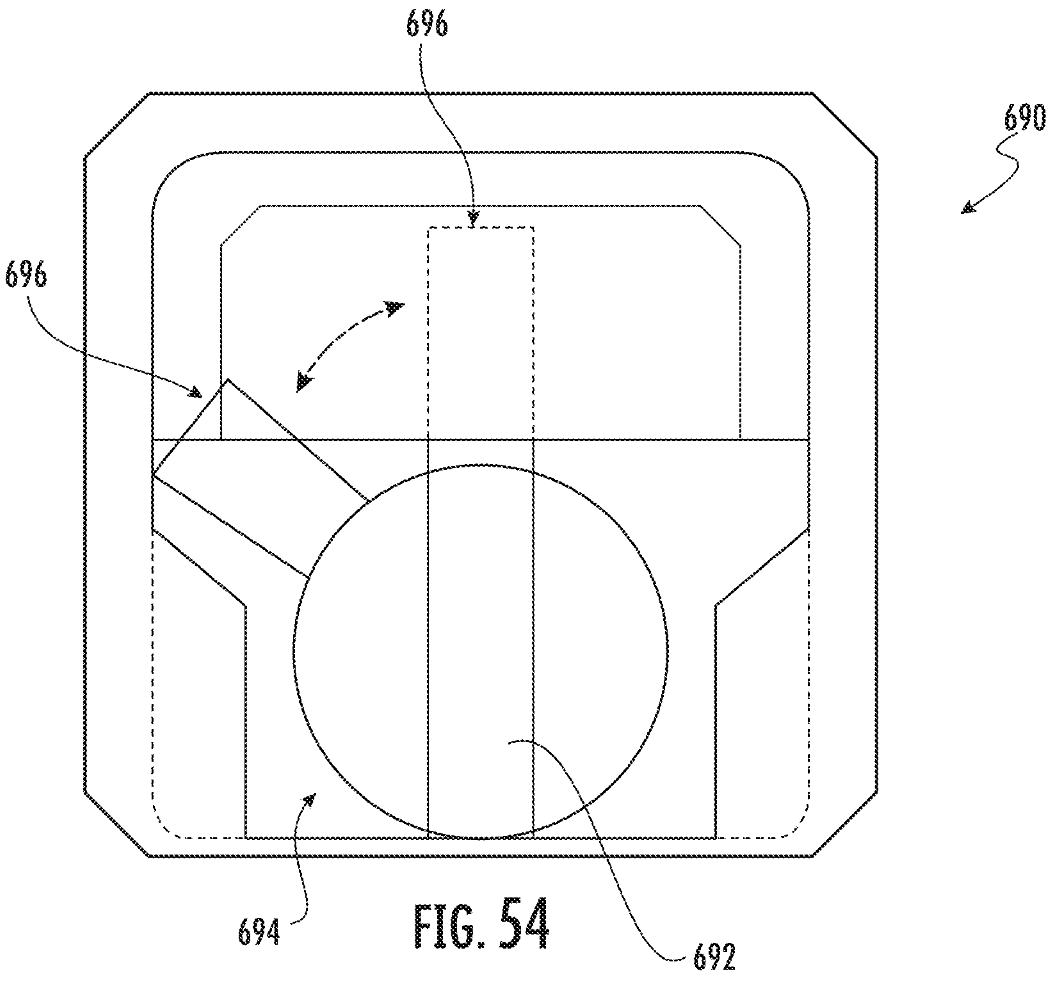
FIG. 54 is a schematic top view of a coupling platform, according to an exemplary embodiment.

Referring to FIG. 54, various aspects of coupling platform 690 are shown. Coupling platform 690 is substantially the same as coupling platform 650 or coupling platform 660 except for the differences discussed herein. Coupling platform 690 includes an interface 692 that actuates arm 696 to push against the back wall of the cleat pocket. In various embodiments, coupling platform 690 includes body 694, interface coupled to body 694, and arm 696 rotatably coupled to body 694. In use, a user inserts coupling platform 690 into body and then rotates arm 696 via interface 692 into the locked position (see broken line outline of arm 696). In this position, arm 696 increases the length of coupling platform 690 along the sliding coupling direction in which coupling platform 690 was inserted into the cleat pocket. In particular, arm 696 interfaces against the back wall of the cleat pocket to bias coupling platform 690 from being removed from the cleat pocket. Arm 696 can also be actuated into the unlocked position (see solid line outline of arm 696), thereby freeing coupling platform 690 to be decoupled from the cleat pocket. In various embodiments, coupling platform 690 includes a male coupler (e.g., similar to male coupler 394) extending from a bottom of body 694, the male coupler engaging with the ribs of the cleat pocket.

Figure 55:
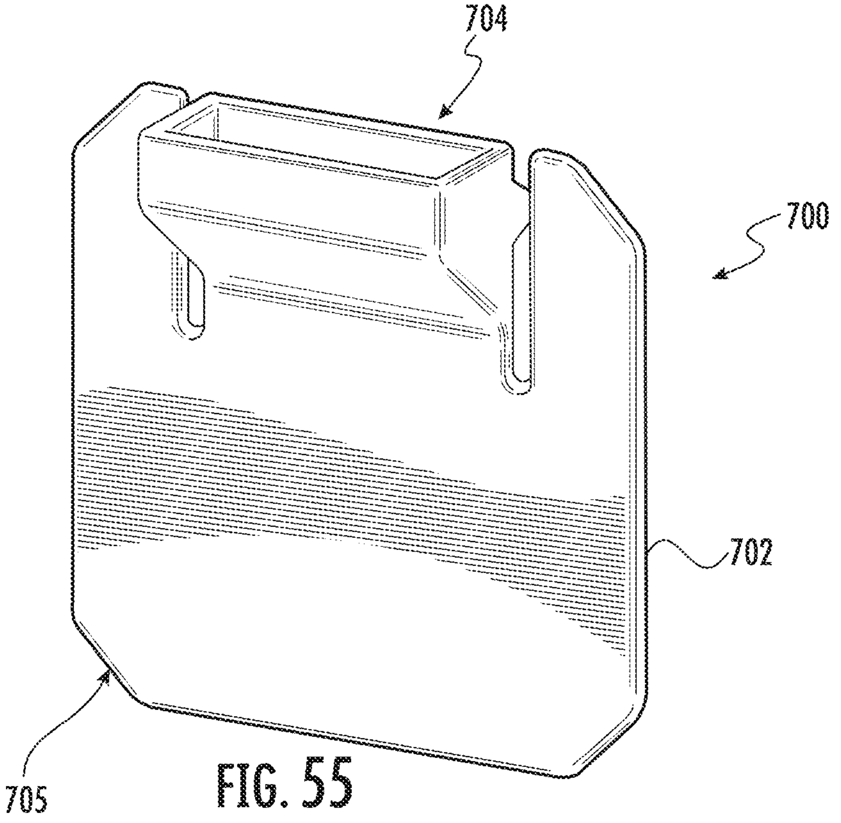
FIG. 55 is a perspective view of a coupling platform, according to an exemplary embodiment.
Figure 56:
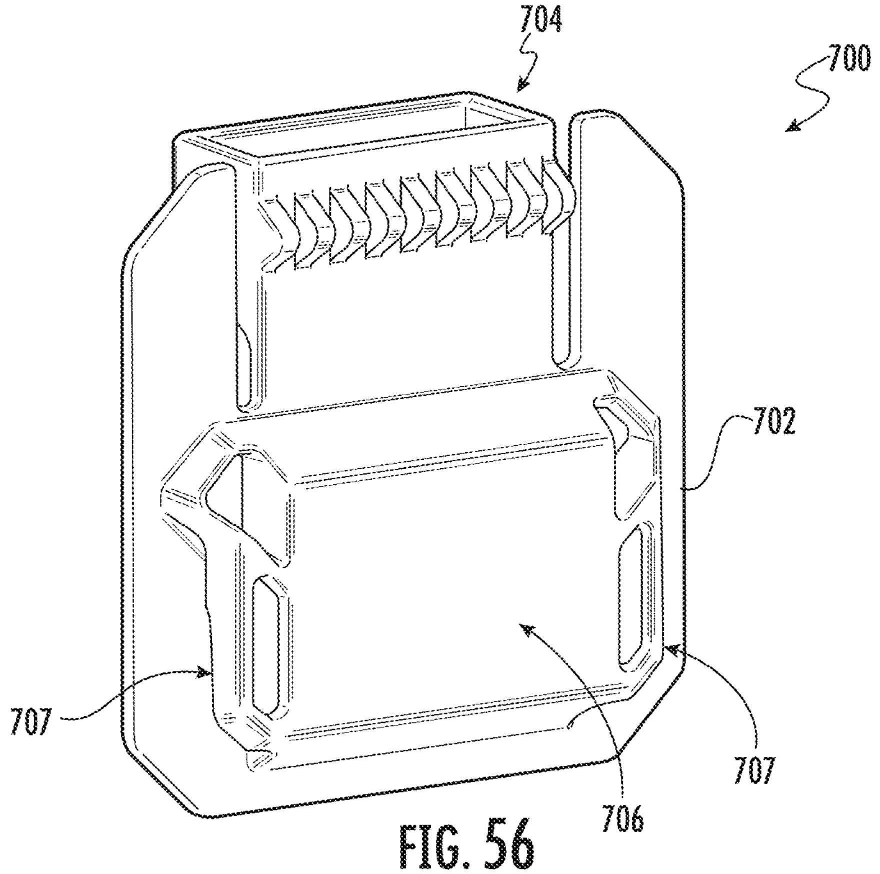
FIG. 56 is a perspective view of the coupling platform of FIG. 55, according to an exemplary embodiment.

Referring to FIGS. 55-56, various aspects of coupling platform 700 are shown. Coupling platform 700 includes a base 702 and an arm 704 extending from base 702, the arm 704 configured to deform with respect to base 702 as coupling platform 700 is inserted into or taken out of a cleat pocket. In use, the end 705 of base 702 opposite arm 704 is inserted into a cleat pocket and underneath the ribs of the cleat pocket such that male coupler 706 extends towards and interfaces against the recessed surface of the cleat pocket. As coupling platform 700 is being inserted in the cleat pocket, arm 704 deforms via interfacing with a top edge of the cleat pocket. When coupling platform 700 is fully inserted into the cleat pocket, arm 704 snaps into the cleat pocket, thereby securing coupling platform 700 in the cleat pocket via ribs 707 of male coupler 706 extending under the ribs of the cleat pocket. To remove coupling platform 700 from the cleat pocket, the coupling platform 700 is pushed in the direction of arm 704, causing arm 704 to once again deform via interfacing with a top of the cleat pocket, until the coupling platform 700 is fully removed from underneath the ribs of the cleat pocket.

Figure 57:
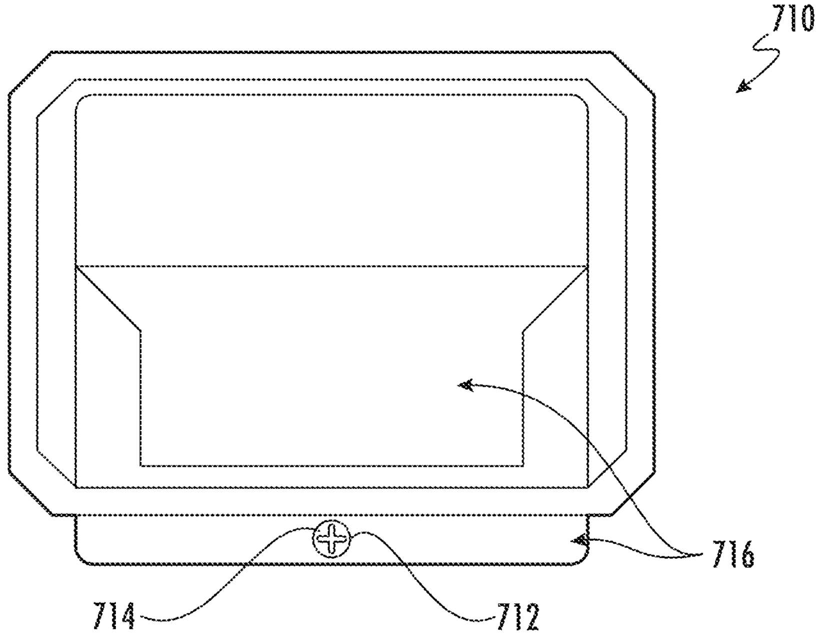
FIG. 57 is a schematic top view of a coupling platform, according to an exemplary embodiment.
Figure 58:
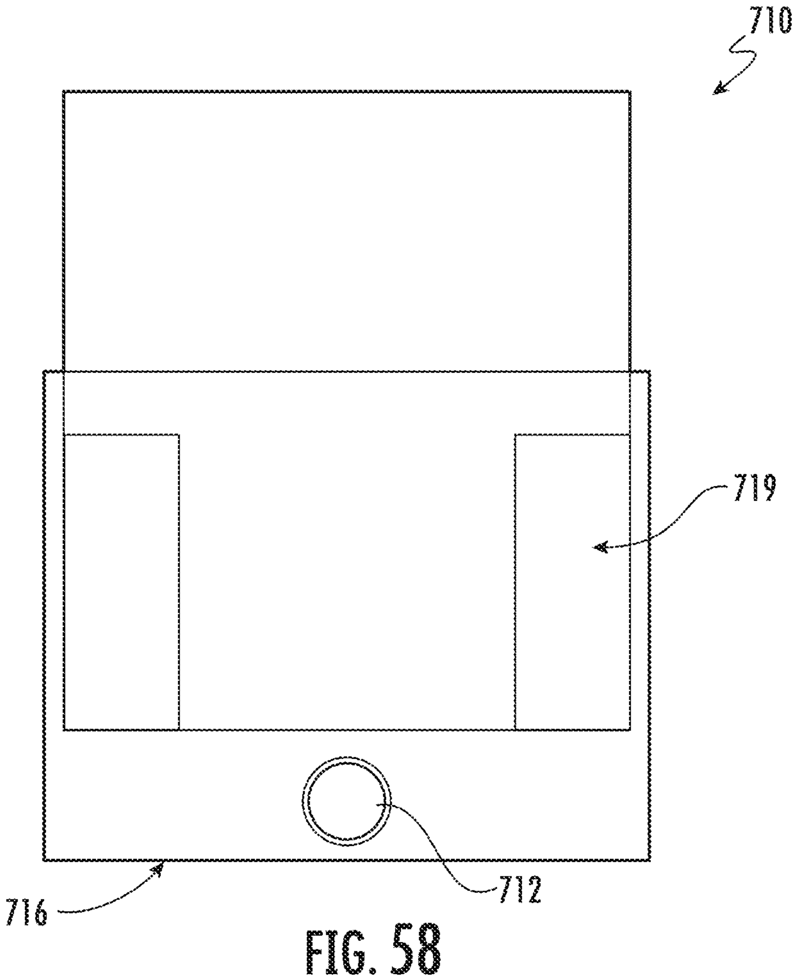
FIG. 58 is a schematic top view of the coupling platform of FIG. 57, according to an exemplary embodiment.

Referring to FIGS. 57-58, various aspects of coupling platform 710 are shown. Coupling platform 710 is configured to be used with cleat pockets that do not include a back wall underneath the ribs of the cleat pocket. When coupled to a cleat pocket, lower plate 716 of coupling platform 710 extends past the cleat pocket until aperture 712 (e.g., a screw hole) defined by lower plate 716 is aligned with an aperture defined by the object 719 that includes the cleat pocket. For example, aperture 712 of lower plate 716 is aligned with an aperture used to couple a mounting plate to a wall, and then an elongate object, shown as screw 714 is inserted through the apertures, thereby securing coupling platform 710 to the mounting plate. To decouple coupling platform 710 from the mounting plate, the screw is removed and then coupling platform 710 is slid out of the cleat pocket. In a specific embodiment, coupling platform 710 includes lower plate 716, which defines aperture 712. In various embodiments lower plate 716 is planar and is inserted into a cleat pocket until aperture 712 is aligned with an aperture in the structure including the cleat pocket.

Figure 59:
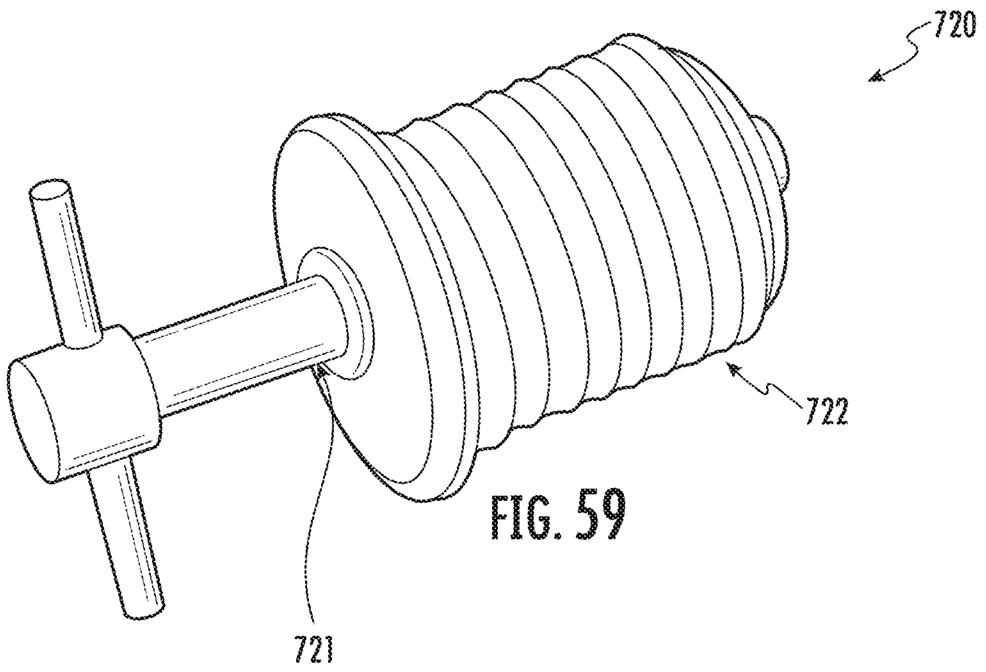
FIG. 59 is a perspective view of a coupling platform, according to an exemplary embodiment.
Figure 60:
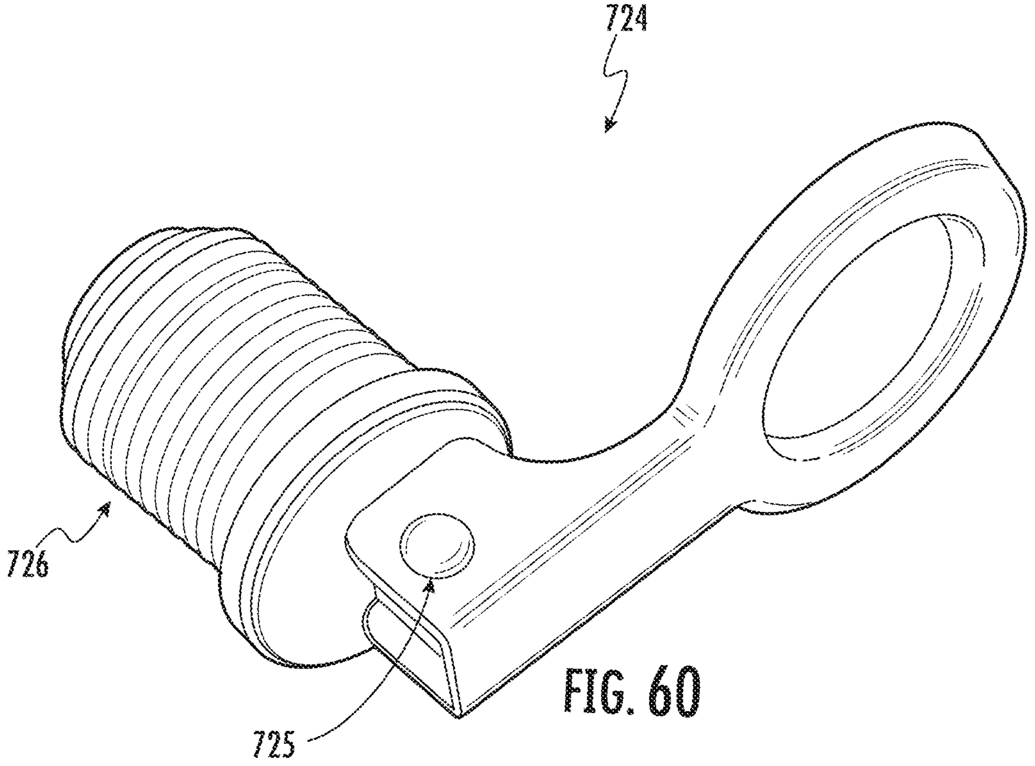
FIG. 60 is a perspective view of a coupling platform, according to an exemplary embodiment.

Referring to FIGS. 59-60, various aspects of coupling platform 720 and coupling platform 724 are shown. Coupling platform 720 and coupling platform 724 include an inflatable element, shown as balloon 722 and balloon 726, respectively. In use, the balloon 722, 726 expand under the ribs of a cleat pocket to couple the coupling platform to the cleat pocket. In various embodiments, the balloons expand via the plates on either side of the balloons being forced together, thereby biasing the balloons to expand laterally. Friction between the balloon and the cleat pocket (e.g., the underside of the ribs) biases coupling platform 720 and coupling platform 724 to remain in the cleat pocket. In a specific embodiment, coupling platform 720 includes body 721 (e.g., extending along a longitudinal axis within balloon 722) and balloon 722 coupled to body 721. In a specific embodiment, coupling platform 724 similarly includes a body 725 and balloon 726 coupled to body 725.

Figure 61:
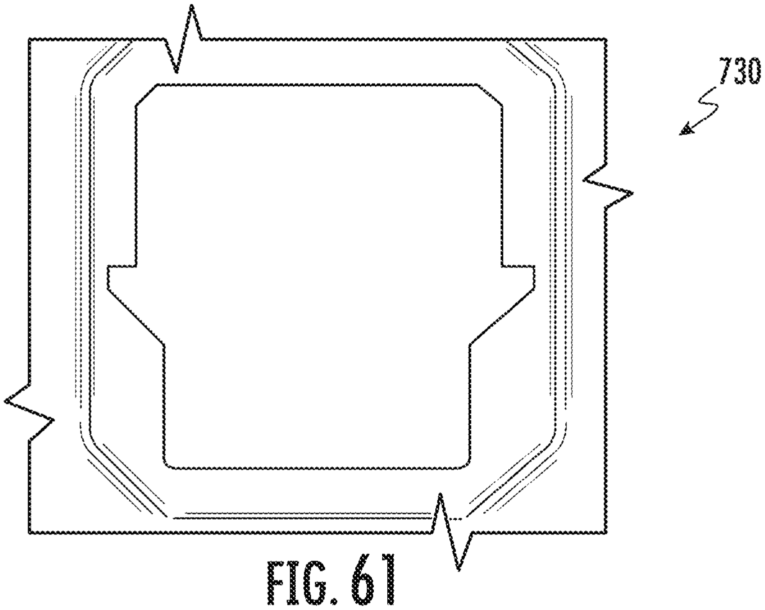
FIG. 61 is a top view of a coupling platform, according to an exemplary embodiment.
Figure 62:
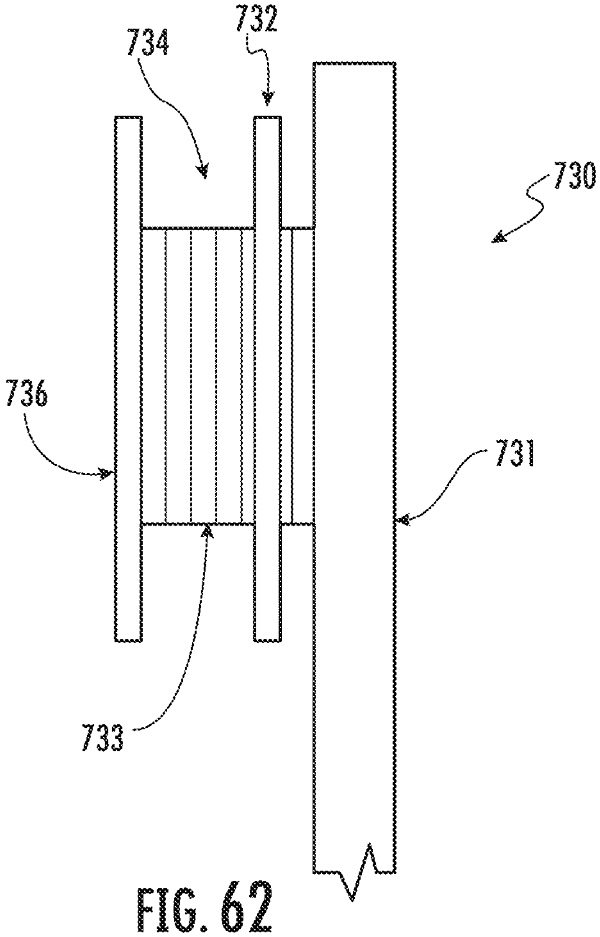
FIG. 62 is a schematic side view of the coupling platform of FIG. 61, according to an exemplary embodiment.

Referring to FIGS. 61-62, various aspects of coupling platform 730 are shown. Coupling platform 730 couples to the ribs of the cleat pockets. In particular, nut 732 includes a threaded 734 such that nut 732 actuates along to couple and decouple coupling platform 730 with the ribs of the cleat pocket.

In a specific embodiment, coupling platform 730 includes body 731, an arm 733 extending away from body 731, at least a portion of the outer surface of arm 733 including threading 734, a nut 732 threadably coupled to arm 733 via threading 734, and lower plate 736, the arm 733 extending between body 731 and lower plate 736. In use, lower plate 736 is inserted beneath ribs of a cleat pocket, and then nut 732 is tightened against the ribs of the cleat pocket such that nut 732 and lower plate 736 exert a squeezing force against the rib(s) of the cleat pocket, thereby securing coupling platform 730 to the cleat pocket.

Figure 63:
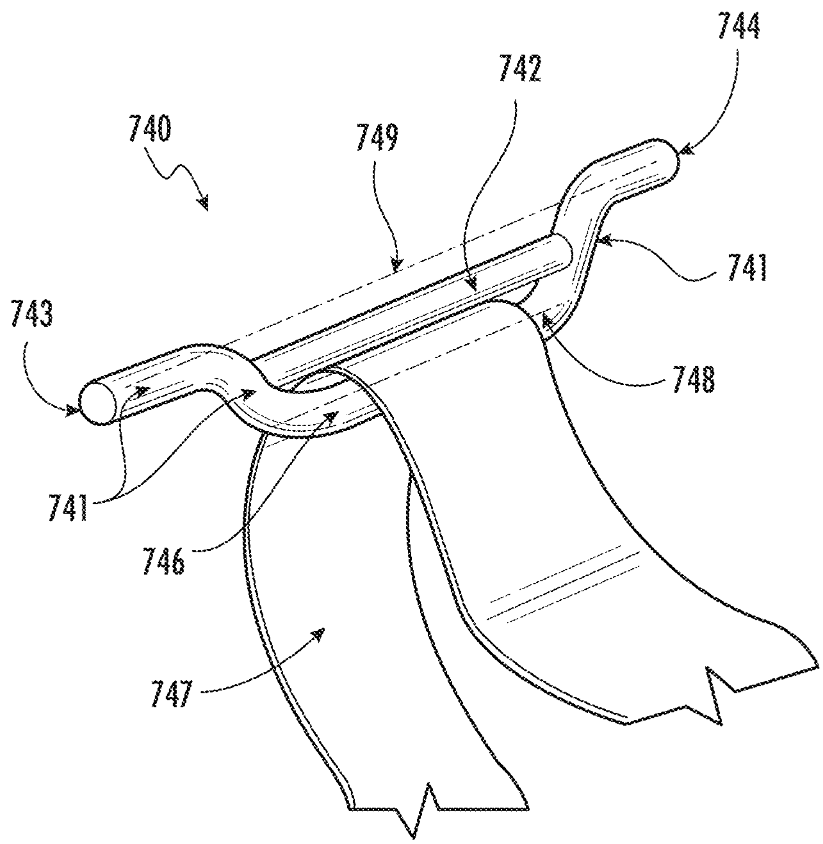
FIG. 63 is a schematic perspective view of a coupling platform, according to an exemplary embodiment.

Referring to FIG. 63, various aspects of coupling platform 740 are shown. Coupling platform 740 includes a T-shape body that slides under the ribs of a cleat pocket, thereby coupling the coupling platform 740 to the cleat pocket. In various embodiments coupling platform 740 has a wireform shape, and drops in behind the pocket.

In a specific embodiment, coupling platform 740 includes arm 741 extending from a first end 743 to an opposing second end 744. First end 743 and second end 744 each extend along longitudinal axis 749. First end 743 and second end 744 extend from opposing ends of central portion 746, which extends along a second longitudinal axis 748 that is not co-axial with longitudinal axis 749. In various embodiments, coupling platform 740 includes a support arm 742 extending between first end 743 and second end 744, the support arm 742 extending between longitudinal axis 749 and longitudinal axis 748. In various embodiments, an object 747 (e.g., a flexible tether) extends between support arm 742 and central portion 746. In use, first end 743 and second end 744 are inserted under the ribs of a cleat pocket to secure coupling platform 740 to the cleat pocket. An exemplary method to remove the coupling platform 740 is to pull on object 747 away from being underneath the ribs of the cleat pocket, thereby freeing coupling platform 740 from the cleat pocket.

Figure 64:
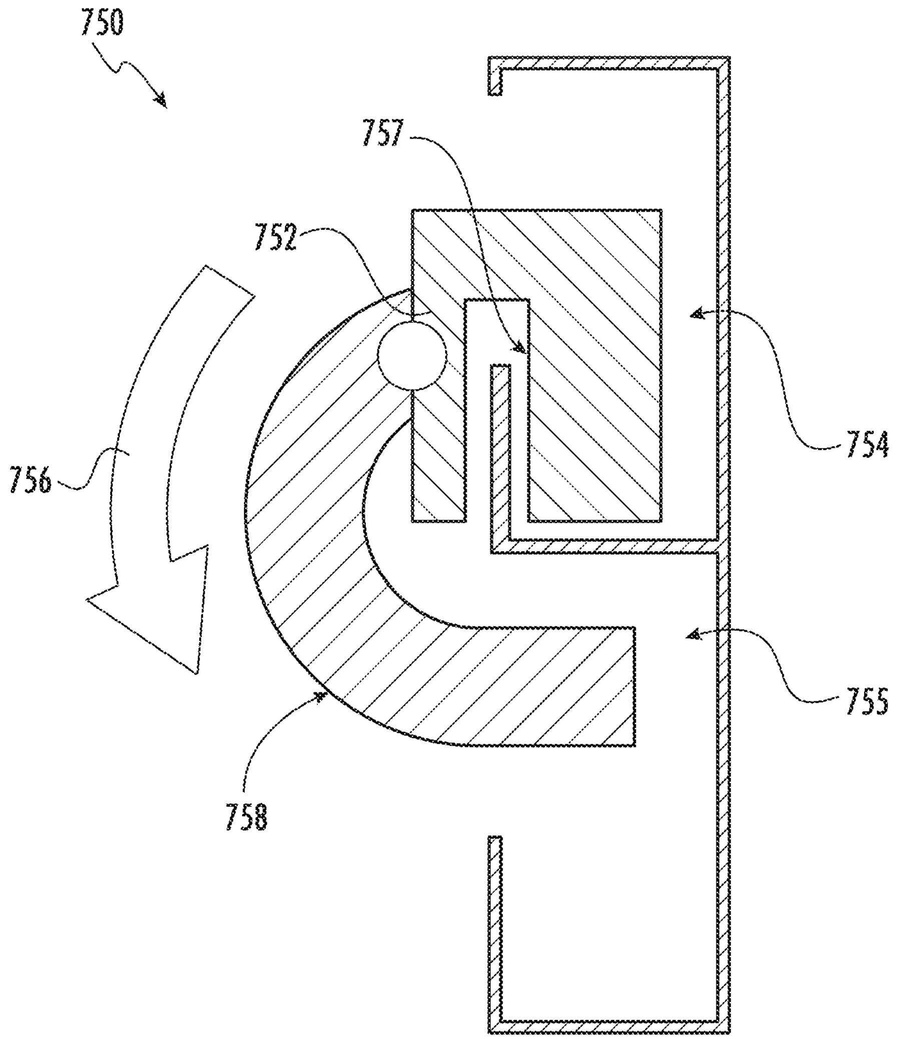
FIG. 64 is a schematic side view of a coupling platform, according to an exemplary embodiment.

Referring to FIG. 64, various aspects of coupling platform 750 are shown. Coupling platform 750 includes a body 752 and an arm 758 coupled to body 752 (e.g., slidably coupled). In various embodiments, arm 758 rotates in direction 756 from a first pocket 754 (e.g., cleat pocket) to a second pocket 755 (e.g., from an upper pocket 754 to a lower pocket 755). Thus, coupling platform 750 is configured to be contemporaneously coupled to a lower portion of a first pocket 754 (e.g., the upper cleat pocket in FIG. 64) and an upper portion of a second pocket 755 when arm 758 is extends into second pocket (e.g., the lower cleat pocket in FIG. 64).

In a specific embodiment, coupling platform 750 includes body 752, arm 758 coupled to body 752, the arm 758 sliding along an arcuate path away from (in direction 756) and towards body 752). In particular, arm 758 actuates between a locked position, in which arm 758 is fully extended from body 752, and an unlocked position, in which arm 758 is fully retracted towards and at least partially within body 752. In various embodiments, body 752 includes a locking wall 757 (e.g., a planar wall) that is coplanar and interfaces with the inside surface of the ribs of the cleat pocket.

Referring to FIGS. 65-68, various aspects of coupling platform 760 are shown. Coupling platform 760 is substantially the same as coupling platform 750 except for the differences discussed herein. In particular, coupling platform 760 first couples to a bottom portion of a first cleat pocket and then pivots downward to couple to an upper portion of a second cleat pocket immediately below the first cleat pocket. In various embodiments, coupling platform 760 includes a first projection that extends under the ribs of the first cleat pocket, and the first projection biases the body of coupling platform 760 into the mounting structure (e.g., into the latch pockets) until the lower portion of coupling platform 760 extends within the second cleat pocket.

Figure 65:
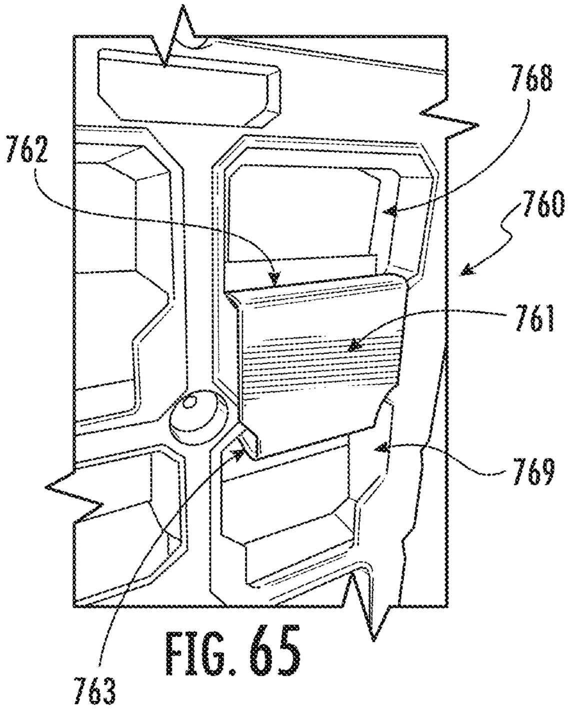
FIG. 65 is a perspective view of a coupling platform, according to an exemplary embodiment.
Figure 66:
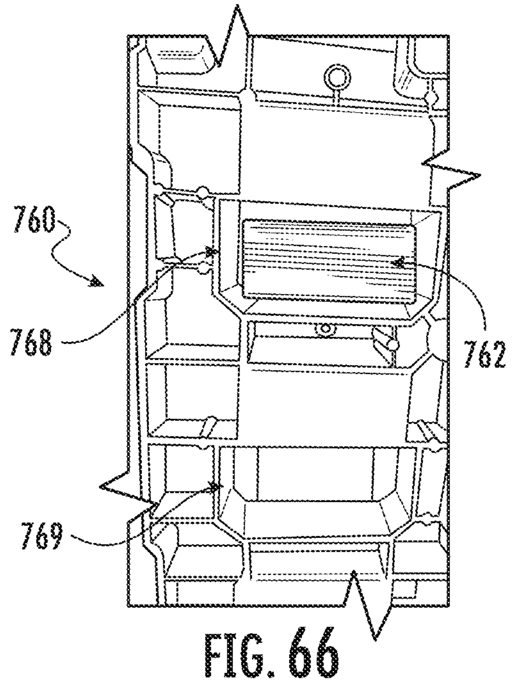
FIG. 66 is a perspective view of the coupling platform of FIG. 65, according to an exemplary embodiment.
Figure 67:
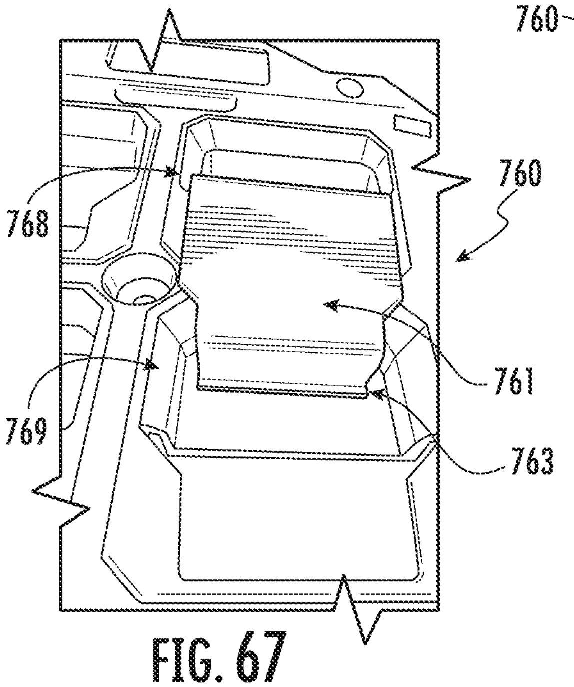
FIG. 67 is a perspective view of the coupling platform of FIG. 65, according to an exemplary embodiment.
Figure 68:
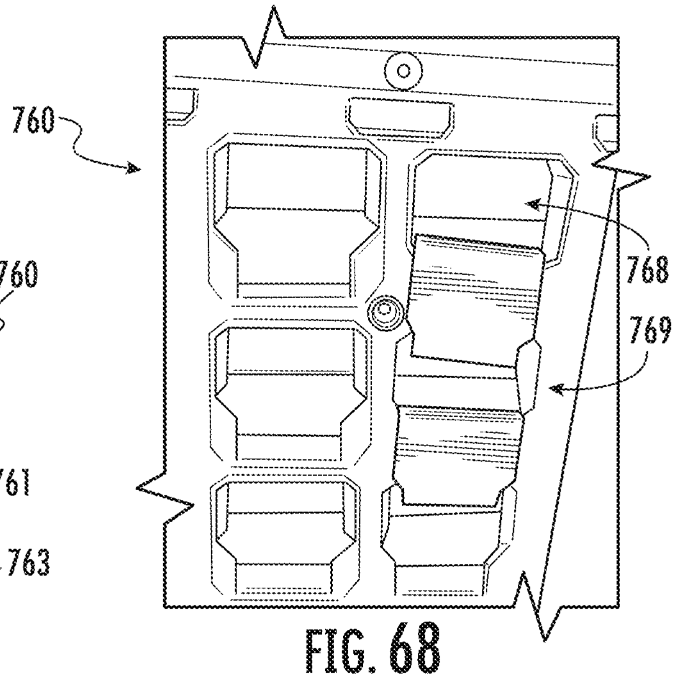
FIG. 68 is a perspective view of the coupling platform of FIG. 65, according to an exemplary embodiment.

In a specific embodiment, coupling platform 760 includes body 761, upper arm 762 extending from an upper portion of body 761, upper arm 762 being configured to couple to an upper cleat pocket 768, and lower arm 763 extending from a lower portion of the body 761, the lower arm 763 being configured to couple to a lower cleat pocket 769. Referring to FIG. 65, upper arm 762 is inserted into upper cleat pocket 768 such that upper arm 762 is underneath the ribs of the upper cleat pocket 768. Referring to FIG. 66, a rear view of coupling platform 760 is shown. Upper arm 762 extending around the ribs of the cleat pocket (e.g., the ribs are between upper arm 762 and body 761). Referring to FIG. 67, lower arm 763 is inserted into a lower cleat pocket 769 beneath the upper cleat pocket 768, thereby coupling the coupling platform 760 to the upper cleat pocket 768 and the lower cleat pocket 769.

Figure 69:
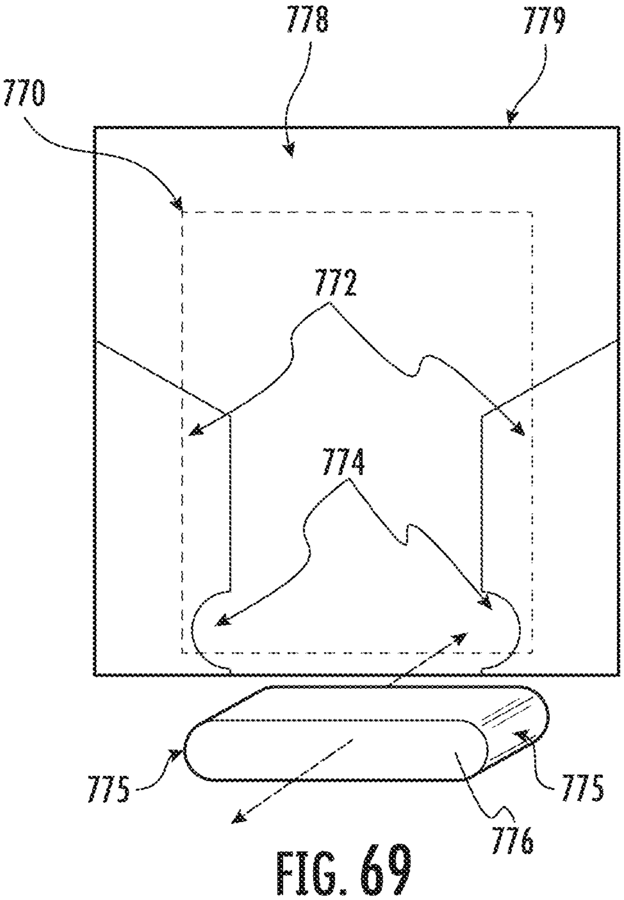
FIG. 69 is a schematic top view of a coupling platform, according to an exemplary embodiment.
Figure 70:
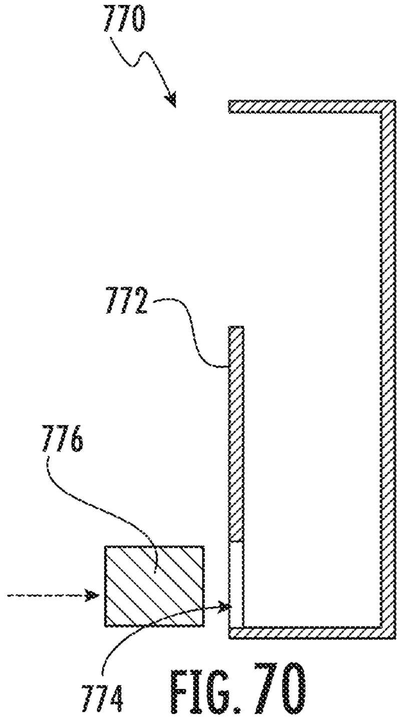
FIG. 70 is a schematic side view of the coupling platform of FIG. 69, according to an exemplary embodiment.

Referring to FIGS. 69-70, various aspects of coupling platform 770 are shown. Coupling platform 770 is configured to be coupled to ribs 772 of cleat pockets that include a recess extending into a side of the ribs 772, shown as cutout 774. Stated another way, cleat pocket 779 includes ribs 772 extending above recessed surface 778, ribs 772 include cutout 774, such as an arcuate cutout, and projection 776 includes ends 775 that are sized (e.g., arcuate-shaped) to be received within cutouts 774. When coupling platform 770 (shown schematically) is inserted into the cleat pocket, a projection 776 is inserted through the cutouts 774 and into the coupling platform 770, thereby securing the coupling platform 770 to the cleat pocket. In various embodiments, coupling platform includes a recess and/or an aperture sized to receive projection 776. To remove coupling platform 770 (shown schematically) from the pocket, the projection 776 is first retracted from cutouts 774, and then coupling platform 770 is removed from the pockets.

Figure 71:
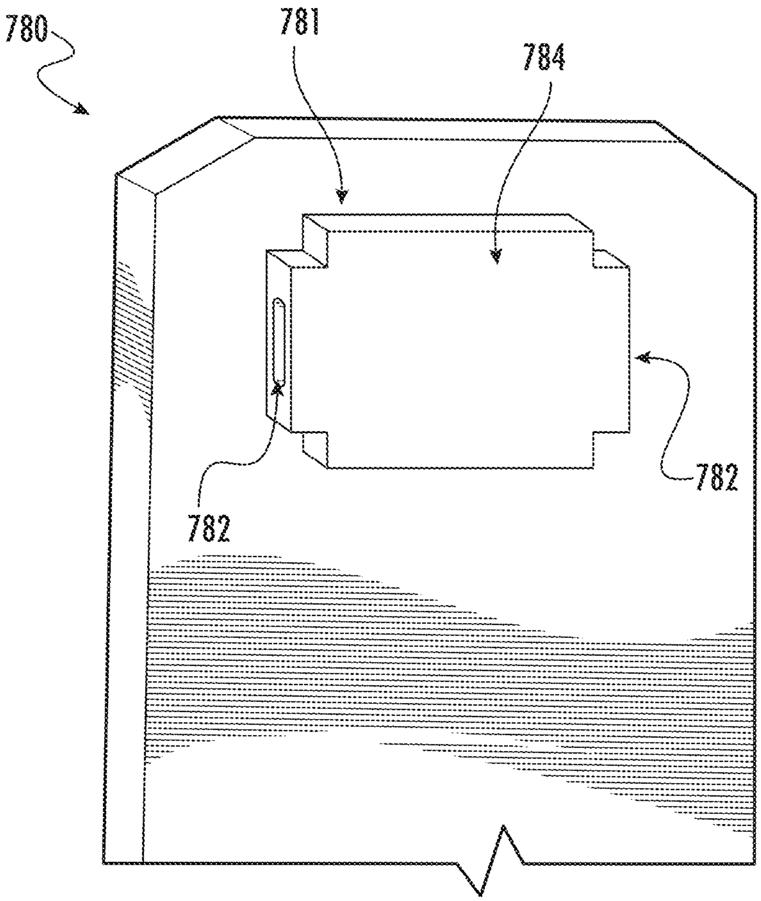
FIG. 71 is a schematic perspective view of a coupling platform, according to an exemplary embodiment.

Referring to FIG. 71, various aspects of coupling platform 780 are shown. Coupling platform 780 includes one or more deformable portions 782 configured to deform as coupling platform 780 is inserted under ribs of a pocket. When inserted under the ribs, coupling platform 780 maintains a coupling with the cleat pocket via an interference fit between deformable portions 782 and the ribs. In various embodiments, deformable portions are formed from a relatively deformable material, such as rubber.

In a specific embodiment, coupling platform 780 includes body 781, projection 784 extending from body 781, and a pair of deformable portions 782 extending from opposing sides of body 781.

Figure 72:
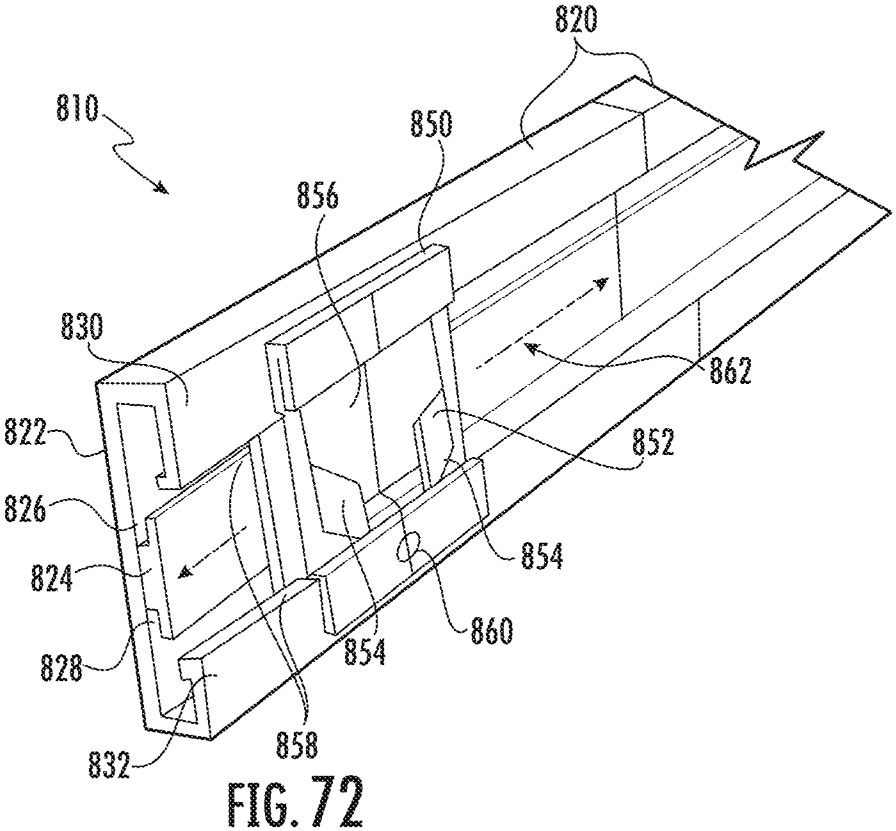
FIG. 72 is a perspective view of a mounting system, according to an exemplary embodiment.

Referring to FIG. 72, various aspects of mounting system 810 are shown. Mounting system 810 is substantially the same as mounting system 110 except for the differences discussed herein. In particular, mounting structure 820 and support element 850 are coupled together via a different structure.

Mounting structure 820 is coupled to a surface, such as a wall. Mounting structure 820 includes plate 822 and a central projection 824 extending outward from plate 822. Central projection 824 includes one or more tongues that extend above and over plate 822, defining upper channel 826 and lower channel 828. Upper wall 830 is coupled to an upper end of plate 822 and extends downward over plate 822, and lower wall 823 is coupled to a lower end of plate 822 and extends upward over plate 822.

Figure 73:
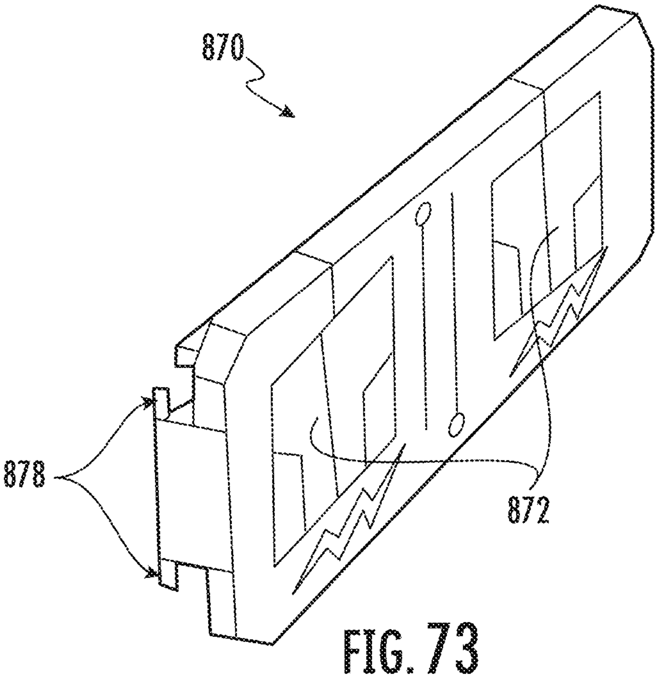
FIG. 73 is a perspective view of a support element, according to an exemplary embodiment.

Arms 858 extend from support element 850 to slidably couple support element 850 to mounting structure 820, such as by extending under upper wall 830 and lower wall 832 (similar to arms 878 of support element 870 in FIG. 73). Support element 850 includes pocket 852 configured to couple with various coupling mechanisms. In various embodiments, ribs 854 extend above recessed surface 856. In various embodiments, support element 850 includes a fastener 860 configured to secure support element 850 to the mounting structure 820 (e.g., to bias support element 850 to not slide with respect to mounting structure 820 via frictional engagement). In various embodiments, fastener 860 is a screw.

In an alternative embodiment, support element 850 includes a third rib 854 that extends outside pocket 852. For example, the support element 850 includes two ribs 854 extend from sidewall 862, one rib 854 extending from sidewall 862 to the left into pocket 852 and rib 854 extending from sidewall 862 to the right away from pocket 852. In this way, sidewall 862 is functionally similar to support element 150 in that two ribs extend in opposing directions away from each other, and as a result support element 850 provides the functionality of both a pocket 852 and a sidewall 862 with the functionality of support element 150. In this embodiment, one or more of the coupling structures and/or utility modules can couple to sidewall 862 (e.g., coupling platform 210 in FIG. 10, coupling platform 310 in FIG. 19).

Referring to FIG. 73, various aspects of support element 870 are shown. Support element 870 is substantially the same as support element 150 or support element 850, except for the differences discussed herein. In particular, support element 870 includes two pockets 872 arranged laterally next to each other. Pockets 872 are substantially the same as pocket 852 of support element 850.

Figure 74:
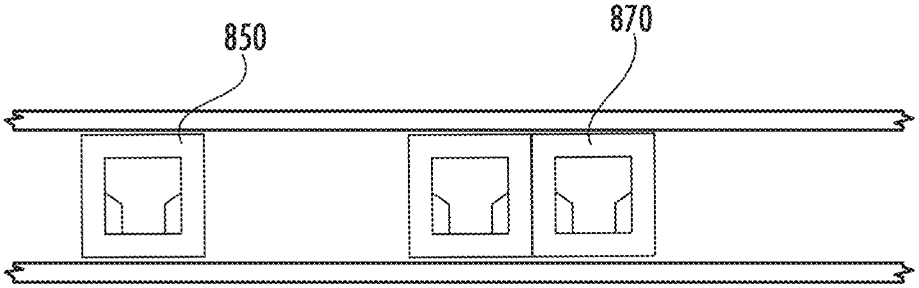
FIG. 74 is a front view of the support element of FIG. 72 and the support element of FIG. 73, according to an exemplary embodiment.

Referring to FIG. 74, various aspects of support element 850 and support element 870 are shown. In various embodiments one or more of support element 850 and one or more of support element 870 couple to the same mounting structure.

Figure 75:
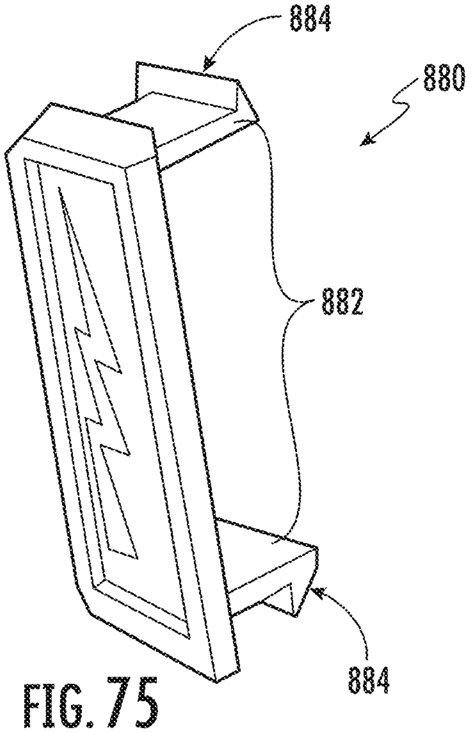
FIG. 75 is a perspective view of a support element, according to an exemplary embodiment.

Referring to FIG. 75, various aspects of support element 880 are shown. Support element 880 is substantially the same as support element 150, support element 850 or support element 870, except for the differences discussed herein. In particular, support element 880 includes arms 882 that couple to the mounting structure. In various embodiments arms 882 include projections 884 that extend away from each other, and the projections are configured to couple support element 880 to the mounting structure (e.g., under the upper and lower walls of the mounting structure).

Figure 76:
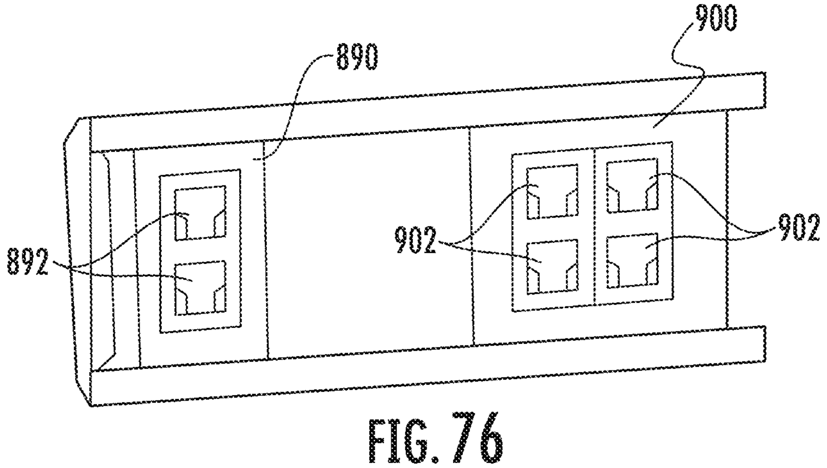
FIG. 76 is a front view of support elements, according to exemplary embodiments.

Referring to FIG. 76, various aspects of support element 890 and support element 900 are shown. Support element 890 is substantially the same as support element 150, support element 850 or support element 870 except for the differences discussed herein. In particular, support element 890 includes two pockets 892 positioned vertically with respect to each other when support element 890 is arranged in the upright configuration (FIG. 76). Support element 900 is substantially the same as support element 150, support element 850 or support element 870 except for the differences discussed herein. In particular, support element 900 includes four pockets 902 positioned in a 2×2 configuration when support element 900 is arranged in the upright configuration (FIG. 76).

Figure 77:
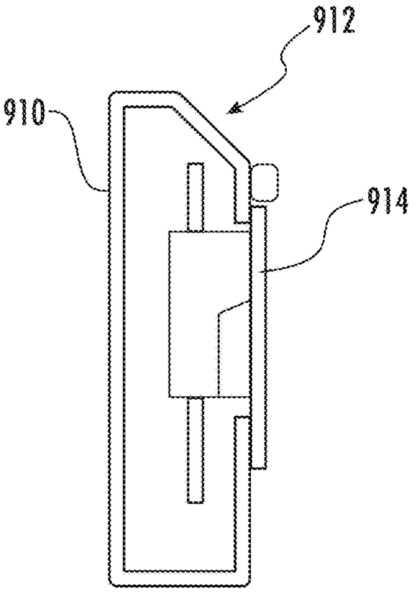
FIG. 77 is a side view of a mounting structure and a support element, according to exemplary embodiments.

Referring to FIG. 77, various aspects of mounting structure 910 are shown. Mounting structure 910 is substantially the same as mounting structure 820 except for the differences discussed herein. In particular, mounting structure 910 includes a recess 912 (e.g., a chamfered corner) configured to receive a latch extending from an object coupled to support element 914 (e.g., a modular tool storage unit with an actuating latch).

Figure 78:
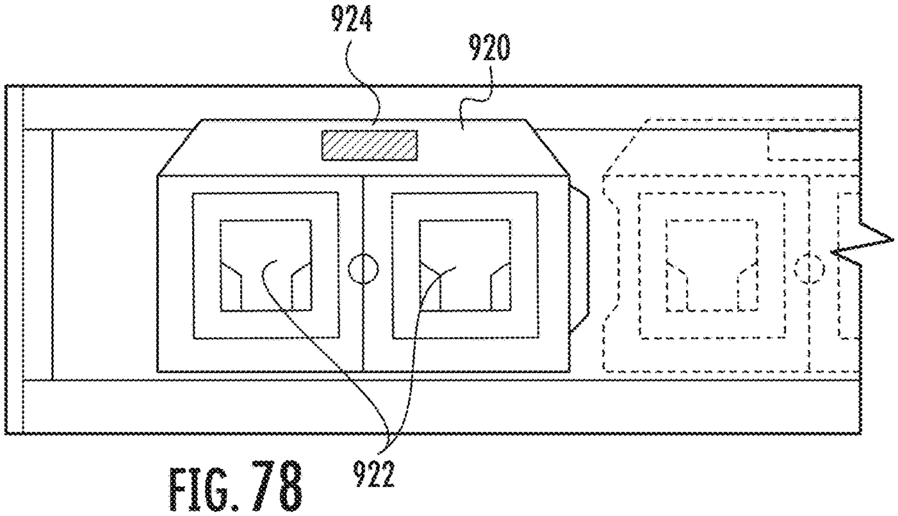
FIG. 78 is a front view of a support element, according to an exemplary embodiment.

Referring to FIG. 78, various aspects of support element 920 are shown. Support element 920 is substantially the same as support element 150, support element 850 or support element 870 except for the differences discussed herein. In particular, support element 920 includes a recess 924 configured to receive a latch, such as a latch extending from an object coupled to support element 920 (e.g., a tool storage unit with an actuating latch). In various embodiments, recess 924 is centrally located above the two or more pockets 922.

Figure 79:
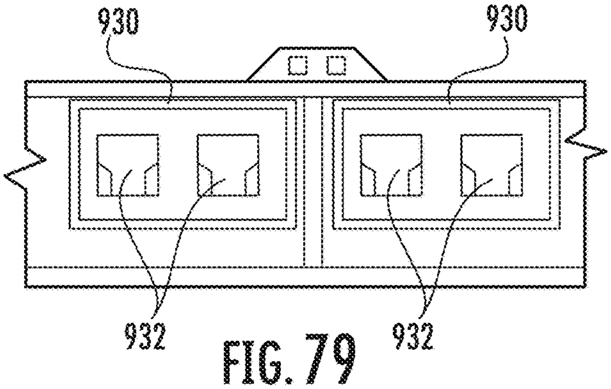
FIG. 79 is a front view of support elements, according to an exemplary embodiment.

Referring to FIG. 79, various aspects of support elements 930 are shown. Support element 930 is substantially the same as support element 150, support element 850, support element 870, or support element 920 except for the differences discussed herein. Two or more support element 930 are configured to be slid next to each other, such as to better support a large and/or heavy object (e.g., a modular tool storage unit with male couplers that couple to pockets 932).

Figure 80:
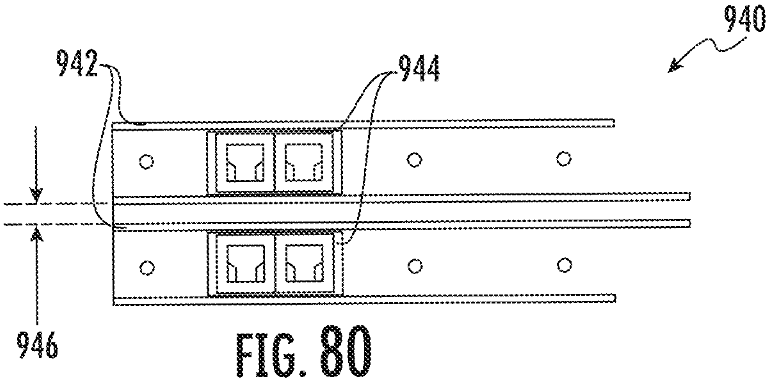
FIG. 80 is a front view of a mounting system, according to an exemplary embodiment.

Referring to FIG. 80, various aspects of mounting system 940 are shown. Mounting system 940 is substantially the same as mounting system 110 or mounting system 810 except for the differences discussed herein. In particular, plates 942 are substantially the same as plates 122 except for the differences discussed herein. In particular, plates 942 in mounting system 940 are placed vertical distance 926 apart when coupled to a surface, such as a wall. This vertical distancing of plates 942 results in support elements 944 being spaced the same vertical distance apart from each other.

Figure 81:
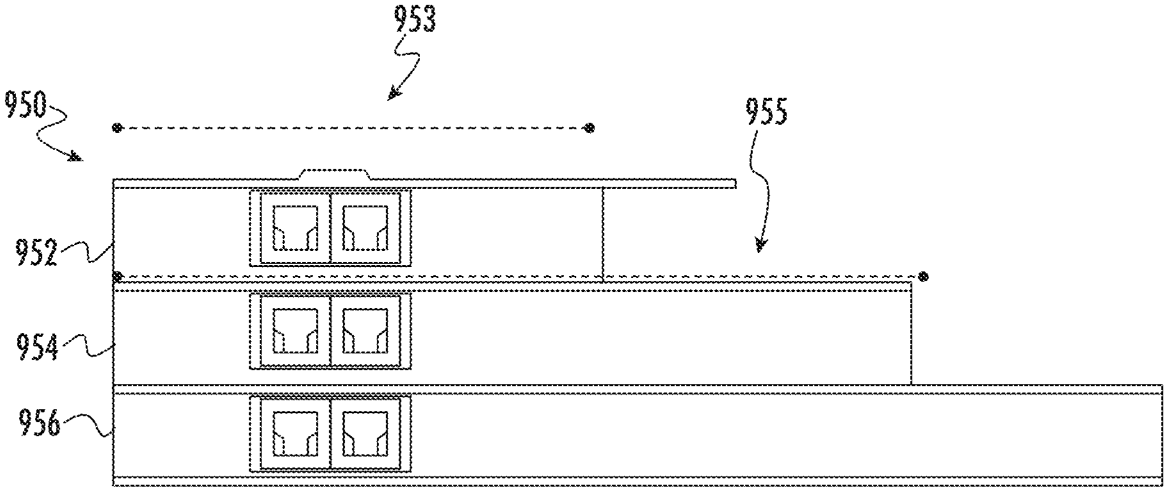
FIG. 81 is a front view of a mounting system, according to an exemplary embodiment.

Referring to FIG. 81, various aspects of mounting system 950 are shown. Mounting system 950 is substantially the same as mounting system 110, mounting system 810 or mounting system 940 except for the differences discussed herein. In particular, plates 952, 954, 956 are substantially the same as plates 122 except for the differences discussed herein. In particular, mounting system 950 includes plates 952, 954, 956 of varying widths. For example, plate 952 has a width 953 of 36" and plate 954 has a width 955 of 48".

Figure 82:
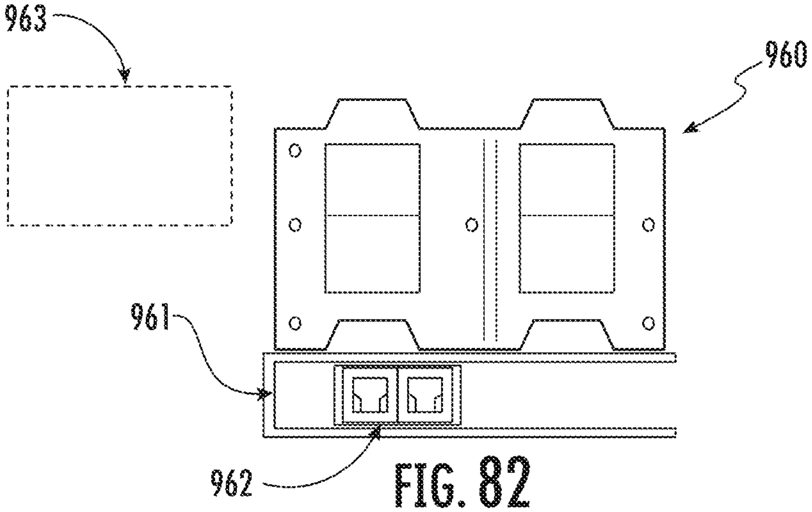
FIG. 82 is a front view of a mounting system, according to an exemplary embodiment.

Referring to FIG. 82, various aspects of mounting system 960 are shown. Mounting system 960 is substantially the same as mounting system 110, mounting system 810, mounting system 940, or mounting system 950 except for the differences discussed herein. In particular, mounting system 960 includes a large object, such as a toolbox 963 (shown schematically, that couples to the support elements 962, which are slidably coupled to plate 961.

Figure 83:
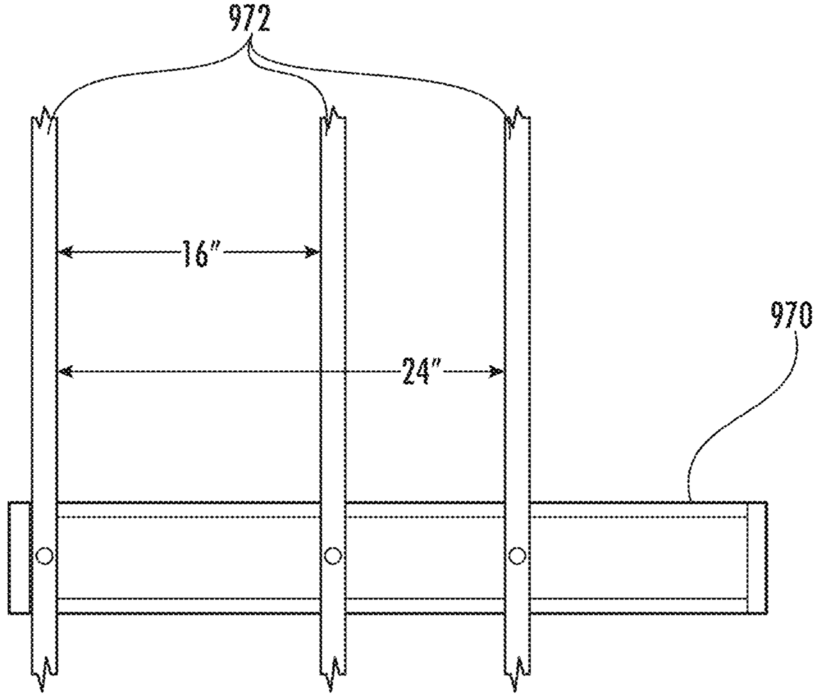
FIG. 83 is a front view of a mounting system, according to an exemplary embodiment.

Referring to FIG. 83 various aspects of mounting structure 970 are shown. Mounting structure 970 is substantially the same as plate 122, mounting structure 820 or mounting structure 910 except for the differences discussed herein. In particular, mounting structure 970 includes apertures spaced at varying distances (e.g., 16", 24"), thereby enabling a user to securely couple mounting structure 970 to studs 972 at different at distances between the studs 972 (e.g., 16", 24").

In various embodiments, the mountings structures and support elements described above are used with any of the other mountings structures and support elements described above.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A coupling platform comprising:

a body;

a first hook extending below and in front of a first side of the body, the first hook configured to couple the coupling platform to an object and thereby support the object;

a first wall rigidly coupled to and extending from a second side of the body opposite the first side;

a first tongue extending from the first wall, the first tongue offset from the body;

a second wall rigidly coupled to and extending from the second side of the body, the second wall horizontally spaced apart from the first wall when a plate supports the coupling platform;

a second tongue extending from the second wall, the second tongue offset from the body, the second tongue horizontally spaced apart from the first tongue when the plate supports the coupling platform;

a first channel collectively defined by the body, the first wall, and the first tongue, the channel extending downward from a first closed end to a second open end, wherein the first channel is configured to receive the plate that supports the coupling platform;

a second channel collectively defined by the body, the second wall, and the second tongue, the second channel extending downward from a first closed end to a second open end; and a detent configured to be actuated between a locked position and an unlocked position, wherein, when the detent is in the locked position, the detent restrains the coupling platform from disengaging from the plate, and when the detent is in the unlocked position, the coupling platform is permitted to disengage from the plate.

2. The coupling platform of claim 1, wherein the coupling platform is configured to slide with respect to the plate supporting the coupling platform.

3. The coupling platform of claim 1, wherein the second channel is configured to receive a second plate that supports the coupling platform.

4. The coupling platform of claim 1, comprising:

a second hook extending below and in front of the first side of the body, the second hook configured to couple the coupling platform to an object and thereby support the object.

5. The coupling platform of claim 4, wherein the first hook and the second hook are configured to collectively couple the coupling platform to an object and thereby support the object.

* * * * *